US012652404B2

(12) United States Patent
Kalva et al.

(10) Patent No.: US 12,652,404 B2
(45) Date of Patent: Jun. 9, 2026

(54) SYSTEMS AND METHODS FOR VIDEO CODING FOR MACHINES USING AN AUTOENCODER

(71) Applicant: OP Solutions LLC, Amherst, MA (US)

(72) Inventors: Hari Kalva, Boca Raton, FL (US); Borivoje Furht, Boca Raton, FL (US); Velibor Adzic, Canton, GA (US)

(73) Assignee: OP Solutions LLC, Amherst, MA (US)

( * ) Notice: Subject to any disclaimer, the term of this patent is extended or adjusted under 35 U.S.C. 154(b) by 0 days.

(21) Appl. No.: 18/806,804

(22) Filed: Aug. 16, 2024

(65) Prior Publication Data

US 2024/0406424 A1      Dec. 5, 2024

Related U.S. Application Data

(63) Continuation of application No. PCT/US2023/013073, filed on Feb. 15, 2023.

(60) Provisional application No. 63/311,333, filed on Feb. 17, 2022.

(51) Int. Cl.
*H04N 19/00*       (2014.01)
*H04N 19/169*      (2014.01)
*H04N 19/42*       (2014.01)

(52) U.S. Cl.
CPC ........... *H04N 19/42* (2014.11); *H04N 19/169* (2014.11)

(58) Field of Classification Search
CPC ...... H04N 19/42; H04N 19/169; H04N 19/61;

H04N 19/436; G06N 3/0464; G06N 3/0495; G06N 3/082; G06N 3/084; G06N 3/0455; G06N 3/088; G06N 20/20
See application file for complete search history.

(56) References Cited

U.S. PATENT DOCUMENTS

| | | | | |
|---|---|---|---|---|
| 5,275,553 | A * | 1/1994 | Frish | F23N 5/082 250/339.04 |
| 6,000,612 | A * | 12/1999 | Xu | G06K 7/10722 235/462.11 |
| 11,720,994 | B2 * | 8/2023 | Luo | G06N 3/047 345/648 |
| 2003/0151810 | A1 * | 8/2003 | Haisch | H04N 13/211 359/464 |

(Continued)

OTHER PUBLICATIONS

Wang et al. "Sparse Tensorbased Multiscale Representation for Point Cloud Geometry Compression" in IEEE Transactions on Pattern Analysis and Machine Intelligence, vol. 45, No. 7, pp. 9055-9071, Jul. 1, 2023, doi: 10.1109/TPAMI.2022.3225816. (Year: 2023).*

(Continued)

*Primary Examiner* — Frank F Huang
(74) *Attorney, Agent, or Firm* — OP Solutions IP Department; Paul Ackerman

(57)          ABSTRACT

Systems and methods for encoding and decoding video for machine consumption (video coding for machines) are provided in which an autoencoder is employed. The autoencoder has an encoder portion, a bottleneck portion, and a decoder portion. The autoencoder being distributed between a VCM encoder and VCM decoder such that the VCM encoder includes the encoder portion and bottleneck portion and the VCM decoder includes the bottleneck portion and the decoder portion.

17 Claims, 18 Drawing Sheets

(56)  References Cited

U.S. PATENT DOCUMENTS

| | | | | |
|---|---|---|---|---|
| 2003/0152145 A1* | 8/2003 | Kawakita | H04N 7/088 | |
| | | | | 348/E7.086 |
| 2005/0243171 A1* | 11/2005 | Ross | H04N 7/18 | |
| | | | | 348/148 |
| 2008/0148877 A1* | 6/2008 | Sim | G01D 4/008 | |
| | | | | 73/866.1 |
| 2009/0131811 A1* | 5/2009 | Morris | A61B 5/091 | |
| | | | | 600/538 |
| 2012/0062615 A1* | 3/2012 | Van Lier | G09G 3/3466 | |
| | | | | 345/208 |
| 2012/0090757 A1* | 4/2012 | Buchan | G06F 21/32 | |
| | | | | 156/60 |
| 2013/0141558 A1* | 6/2013 | Jeon | A61B 1/24 | |
| | | | | 250/353 |
| 2017/0234709 A1* | 8/2017 | Mackie | G01M 3/243 | |
| | | | | 73/861.08 |
| 2023/0229918 A1* | 7/2023 | Park | G06N 3/09 | |
| | | | | 706/15 |
| 2023/0230228 A1* | 7/2023 | Liu | G06V 10/761 | |
| 2023/0237345 A1* | 7/2023 | Zahn | G06N 3/08 | |
| | | | | 706/12 |
| 2023/0273573 A1* | 8/2023 | Hildebrandt | G06Q 10/103 | |
| | | | | 700/48 |
| 2023/0290438 A1* | 9/2023 | Alvarez | G06N 5/022 | |
| 2023/0307908 A1* | 9/2023 | Sun | G06N 3/045 | |
| 2024/0185043 A1* | 6/2024 | Yoon | G06N 3/0455 | |
| 2024/0186018 A1* | 6/2024 | Chen | G06N 3/08 | |
| 2024/0187640 A1* | 6/2024 | Racape | H04N 19/537 | |
| 2024/0193412 A1* | 6/2024 | Bai | G06N 3/08 | |
| 2024/0193827 A1* | 6/2024 | Persson | G01N 23/046 | |
| 2024/0194303 A1* | 6/2024 | Holderrieth | G16B 25/10 | |

OTHER PUBLICATIONS

Pessoa et al.entitled "End-to-End Learning of Video Compression Using Spatio-Temporal Autoencoders" 2020 IEEE Workshop on Signal Processing Systems (SiPS), Coimbra, Portugal, 2020, pp. 1-6, doi: 10.1109/SiPS50750.2020.9195249. (Year: 2020).*

Ma et al. "Image and Video Compression with Neural Networks: A Review." in IEEE Transactions on Circuits and Systems for Video Technology, vol. 30, No. 6, pp. 1683-1698, Jun. 2020, doi: 10.1109/TCSVT.2019.2910119. (Year: 2020).*

* cited by examiner

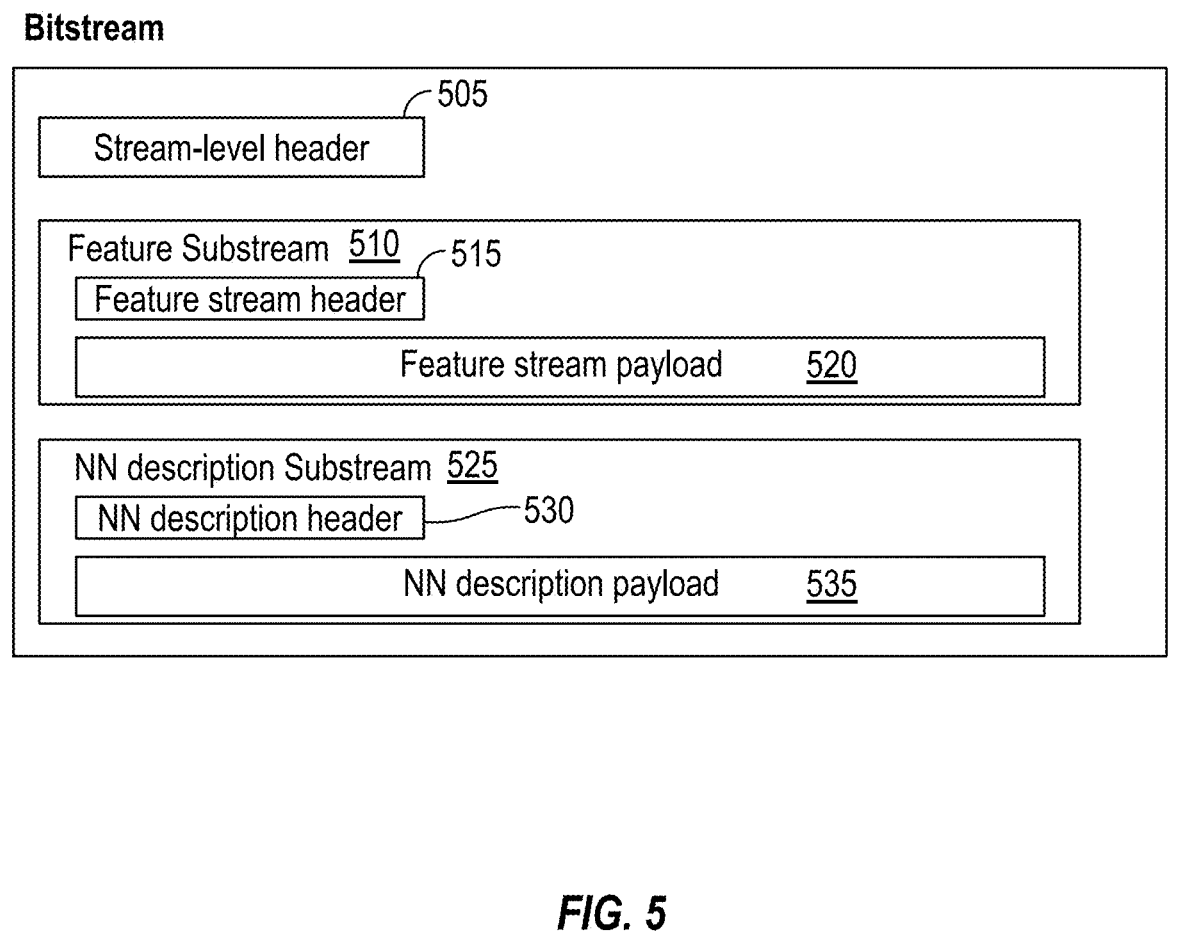

Bitstream

505

Stream-level header

Feature Substream 510    515

Feature stream header

Feature stream payload     520

NN description Substream 525

NN description header    530

NN description payload     535

*FIG. 5*

Figure 1-VCM framework with the autoencoder implementation

Figure 3- Extended VCM decoder with all the components and the additional Task NN element

Figure 12:
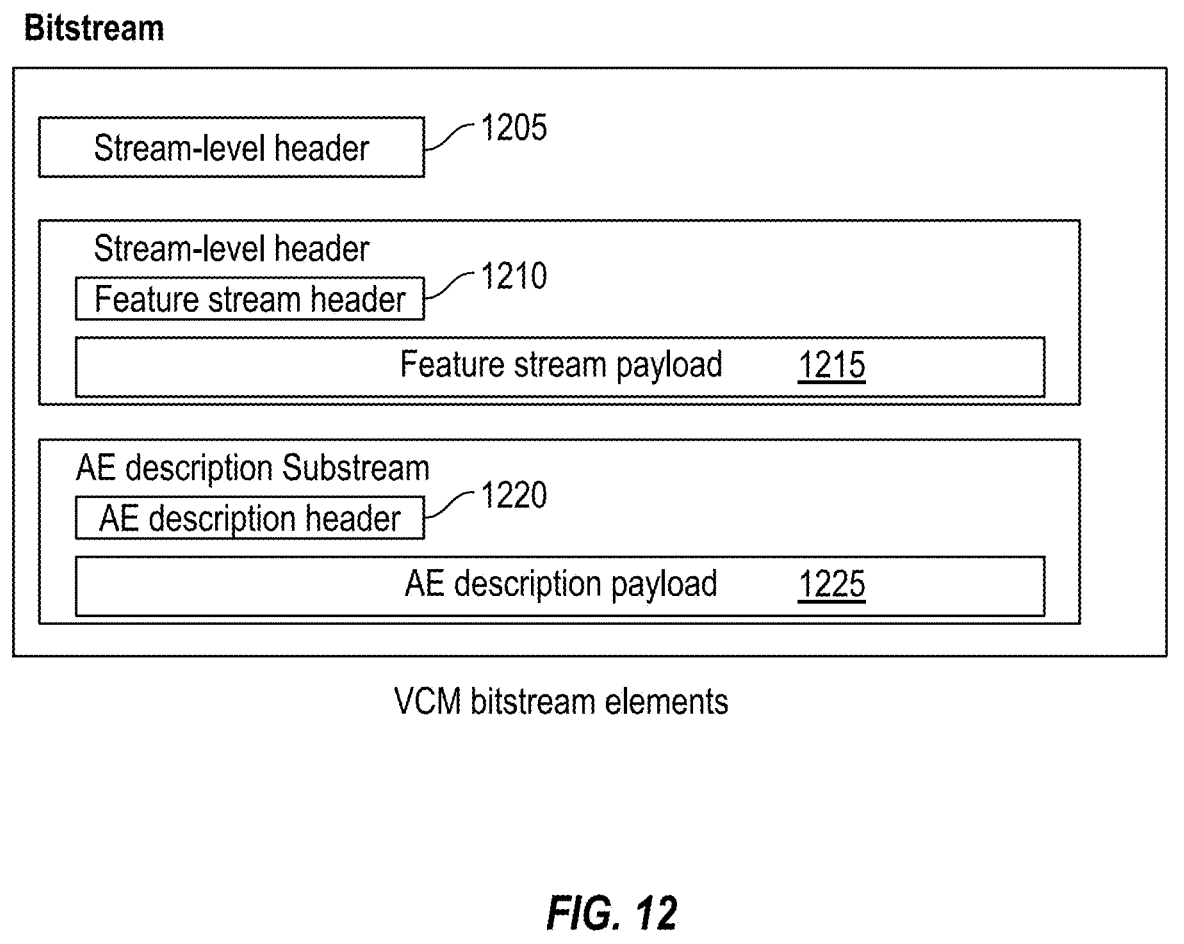

Bitstream

Stream-level header /— 1205

Stream-level header
Feature stream header /— 1210
Feature stream payload    <u>1215</u>

AE description Substream
AE description header /— 1220
AE description payload    <u>1225</u>

VCM bitstream elements

SYSTEMS AND METHODS FOR VIDEO CODING FOR MACHINES USING AN AUTOENCODER

CROSS REFERENCE TO RELATED APPLICATIONS

This application is a continuation of International Application PCT/US2023/013073 filed on Feb. 15, 2023, and titled SYSTEMS AND METHODS FOR VIDEO CODING FOR MACHINES USING AN AUTOENCODER, which claims the benefit of priority to U.S. Provisional Patent Application, Ser. No. 63/311,333 filed on Feb. 17, 2022, and entitled AUTOENCODER FRAMEWORK FOR VIDEO CODING FOR MACHINES, the disclosure of which is hereby incorporated by reference in its entirety.

FIELD OF THE INVENTION

The present invention generally relates to the field of video encoding and decoding. In particular, the present invention is directed to systems and methods for adaptive neural network optimization for multiple task feature coding employing an autoencoder.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, case of editing, random access, end-to-end delay (e.g., latency), and the like.

Motion compensation can include an approach to predict a video frame or a portion thereof given a reference frame, such as previous and/or future frames, by accounting for motion of the camera and/or objects in the video. It can be employed in the encoding and decoding of video data for video compression, for example in the encoding and decoding using the Motion Picture Experts Group (MPEG)'s advanced video coding (AVC) standard (also referred to as H.264). Motion compensation can describe a picture in terms of the transformation of a reference picture to the current picture. The reference picture can be previous in time when compared to the current picture, from the future when compared to the current picture. When images can be accurately synthesized from previously transmitted and/or stored images, compression efficiency can be improved.

While video content is often considered for human consumption, there is a growing need for video in industrial settings and other settings in which the contend is evaluated by machines rather than humans.

Recent trends in robotics, surveillance, monitoring, Internet of Things, etc. introduced use cases in which significant portion of all the images and videos that are recorded in the field is consumed by machines only, without ever reaching human eyes. Those machines process images and videos with the goal of completing tasks such as object detection, object tracking, segmentation, event detection etc. Recognizing that this trend is prevalent and will only accelerate in the future, international standardization bodies established efforts to standardize image and video coding that is primarily optimized for machine consumption. For example, standards like JPEG AI and Video Coding for Machines are initiated in addition to already established standards such as Compact Descriptors for Visual Search, and Compact Descriptors for Video Analytics. Further improving encoding and decoding of video for consumption by machines and in hybrid systems in which video is consumed by both a human viewer and a machine is, therefore, of growing importance in the field.

In many applications, such as surveillance systems with multiple cameras, intelligent transportation, smart city applications, and/or intelligent industry applications, traditional video coding may require compression of large number of videos from cameras and transmission through a network for both machine consumption and for human consumption. Subsequently, at a machine site, algorithms for feature extraction may applied typically using convolutional neural networks or deep learning techniques including object detection, event action recognition, pose estimation and others.

SUMMARY OF THE DISCLOSURE

The present disclosure is directed to systems and methods for encoding and decoding image data for machine consumption using an autoencoder for encoding and decoding feature data.

In one embodiment, a system for transmitting compressed image data in a video coding for machine application is provided. The system includes a video coding for machine (VCM) encoder that comprises an autoencoder encoder portion and an autoencoder bottleneck portion. The VCM encoder receives image information and generates a coded bitstream including feature data of the image information. A VCM decoder is also provided. The VCM decoder includes the same autoencoder bottleneck portion as used in the encoder which is coupled to an autoencoder decoder portion. The VCM decoder receives the coded bitstream at the bottleneck portion and reconstructs the image information from the feature data.

The autoencoder encoder portion is typically a neural network comprising a plurality of successive encoder layers with each successive encoder layer having fewer neurons than the prior layer, and the bottle neck portion having fewer neurons than a final encoder layer. Similarly, the autoencoder decoder portion is typically a neural network comprising a plurality of successive encoder layers with each successive decoder layer having a higher number of neurons than the prior layer, and the bottle neck portion having fewer neurons than the first decoder layer. In some embodiments, the number of encoder layers in the encoder portion is the same as a number of layers in a decoder portion.

In addition, the autoencoder encoder portion may be in communication with the autoencoder decoder portion such that updates to the autoencoder can be communicated between the VCM encoder and VCM decoder.

In some exemplary embodiments, the VCM encoder can further include an autoencoder description encoder coupled to the autoencoder encoder portion and a latent feature encoder coupled to the autoencoder encoder portion. A multiplexor can be provided and coupled to the latent feature encoder and the autoencoder description encoder and providing a coded bitstream.

In some embodiments, the VCM decoder further comprises a demultiplexor receiving the coded bitstream, a latent feature decoder coupled to the demultiplexor, and an autoencoder description decoder coupled to the demultiplexor. The autoencoder decoder portion is preferably coupled to the autoencoder description decoder and the latent feature decoder.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 5 is a block diagram of an exemplary embodiment of a bitstream structure;

FIG. 12 is a block diagram of an exemplary embodiment of a bitstream structure for use with an autoencoder system;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In many applications, such as surveillance systems with multiple cameras, intelligent transportation, smart city applications, and/or intelligent industry applications, traditional video coding may require compression of large number of videos from cameras and transmission through a network to machines and for human consumption. Subsequently, at a machine site, algorithms for feature extraction may applied typically using convolutional neural networks or deep learning techniques including object detection, event action recognition, pose estimation and others.

Figure 1:
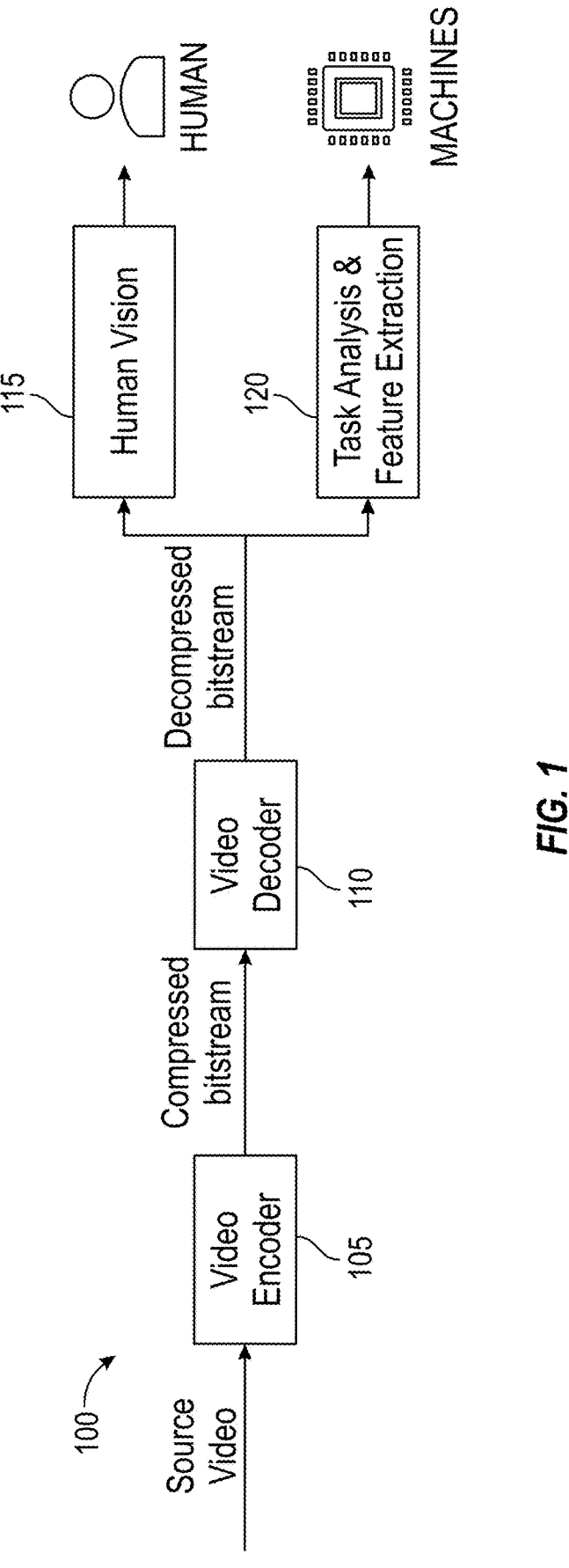
FIG. 1 is a block diagram illustrating an exemplary embodiment of a video coding system.

FIG. 1 shows an exemplary embodiment of a standard compliant (e.g. HEVC, AV1, VVC and the like) coding/decoding system which includes a channel applied for machines. Conventional approaches unfortunately, may require a massive video transmission from multiple cameras, which may take significant time for efficient and fast real-time analysis and decision-making. In certain embodiments, a video coding for machines ("VCM") approach may resolve this problem by both encoding video and extracting some features at a transmitter site and then transmitting a resultant encoded bit stream to a VCM decoder. At a decoder site, video may be decoded for human vision and features may be decoded for machines. As used herein, the term VCM refers broadly to video coding and decoding for machine consumption and is not limited to a specific proposed protocol.

A "feature," as used in this disclosure, is a specific structural and/or content attribute of data. Examples of features may include SIFT, audio features, color hist, motion hist, speech level, loudness level, or the like. Features may be time stamped. Each feature may be associated with a single frame of a group of frames. Features may include high level content features such as timestamps, labels for persons and objects in the video, coordinates for objects and/or regions-of-interest, frame masks for region-based quantization, and/or any other feature that may occur to persons skilled in the art upon reviewing the entirety of this disclosure. As a further non-limiting example, features may include features that describe spatial and/or temporal characteristics of a frame or group of frames. Examples of features that describe spatial and/or temporal characteristics may include motion, texture, color, brightness, edge count, blur, blockiness, or the like. When in offline mode, all machine models as described in further detail below may be stored at encoder and/or in memory of and/or accessible to encoder. Examples of such models may include, without limitation, whole or partial convolutional neural networks, keypoint extractors, edge detectors, salience map constructors, or the like. When in online mode one or more models may be communicated to feature extractor 220 by a remote machine in real time or at some point before extraction.

At a decoder site it will be appreciated that video may be decoded for human vision and features may be decoded for machine use. Systems which provide video for both human vision and for machine consumption are sometimes referred to as hybrid systems. The systems and methods disclosed herein are intended to apply to machine-based systems as well as hybrid systems.

FIG. 1 is a high-level block diagram of a system for encoding and decoding video in a hybrid system which includes consumption of the video content by both human viewers and machine consumption. A source video is received by a video encoder 105 which provides a compressed bitstream for transmission over a channel to video decoder 110. The video encoder may encode the video for human consumption as well as encoding the video for machine consumption. The video decoder 110 provides complimentary processing on the compressed bitstream to extract the video for human vision 115 as well as task analysis and feature extraction 120 for machine consumption. Feature extraction can be classified as any computer vision task, such as edge detection, line detection, object detection, or more recent techniques such as convolutional neural networks where the output of the feature extraction can be spatially mapped back onto the pixel space of the input video. Video coding can include any standard video encoder and/or encoding techniques such as, for example, Advanced Video Codec (AVC), Versatile Video Coding (VVC), or High Efficiency Video Coding (HEVC).

Figure 2:
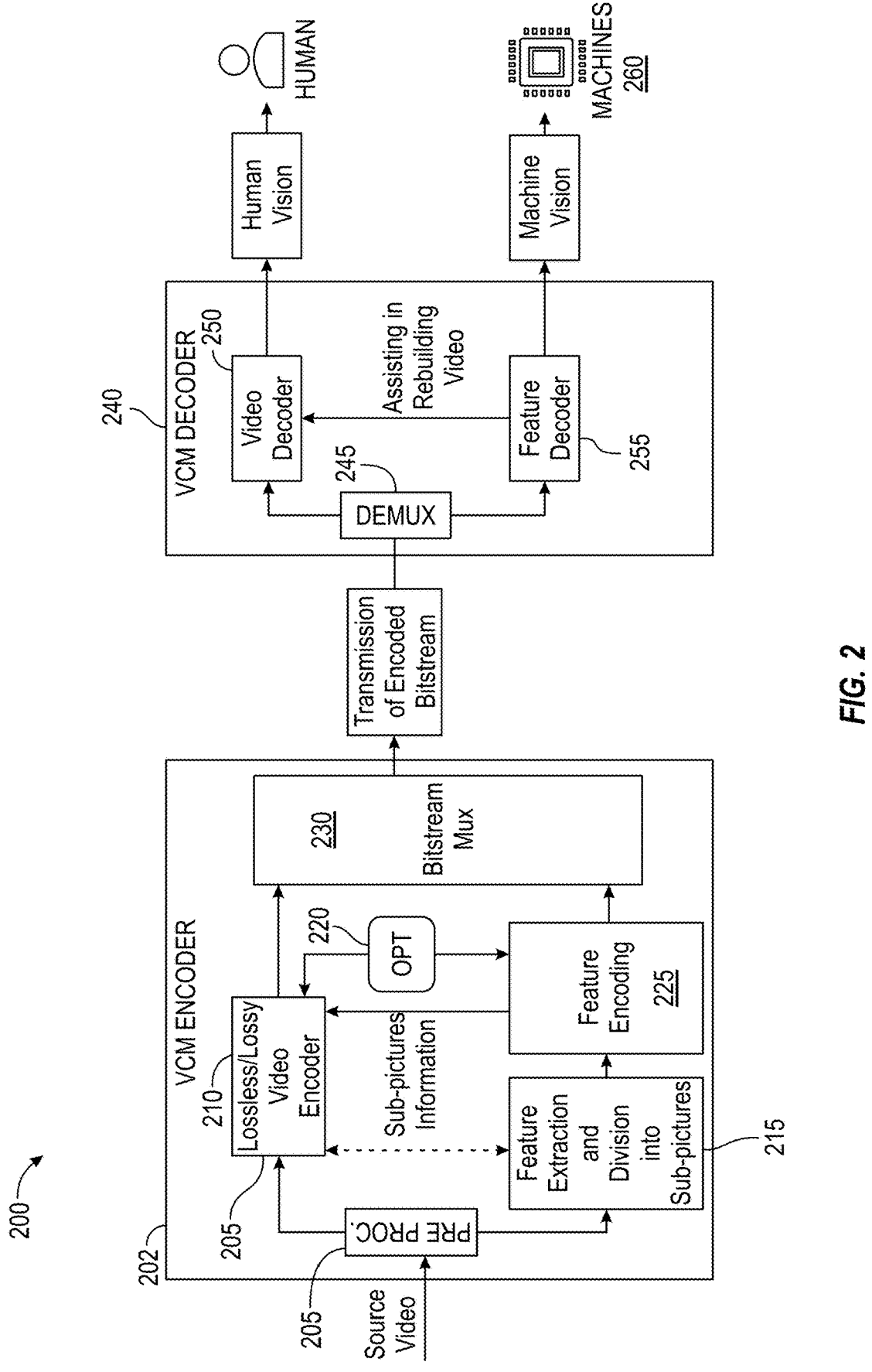
FIG. 2 is a block diagram illustrating an exemplary embodiment of a video coding for machines system.

Referring now to FIG. 2, an exemplary embodiment of encoder for video coding for machines (VCM) is illustrated. VCM encoder 202 may be implemented using any circuitry including without limitation digital and/or analog circuitry; VCM encoder 202 may be configured using hardware configuration, software configuration, firmware configuration, and/or any combination thereof. VCM encoder 202 may be implemented as a computing device and/or as a component of a computing device, which may include without limitation any computing device as described below. In an embodiment, VCM encoder 202 may be configured to receive an input video 204 and generate an output bitstream 208. Reception of an input video 204 may be accomplished in any manner described below. A bitstream may include, without limitation, any bitstream as described below.

VCM encoder 202 may include, without limitation, a pre-processor 205, a video encoder 210, a feature extractor 215, an optimizer 220, a feature encoder 225, and/or a multiplexor 230. Pre-processor 205 may receive input video 204 stream and parse out video, audio and metadata sub-streams of the stream. Pre-processor 205 may include and/or communicate with decoder as described in further detail below; in other words, Pre-processor 205 may have an ability to decode input streams. This may allow, in a non-limiting example, decoding of an input video 204, which may facilitate downstream pixel-domain analysis.

Further referring to FIG. 2, VCM encoder 202 may operate in a hybrid mode and/or in a video mode; when in the hybrid mode VCM encoder 202 may be configured to encode a visual signal that is intended for human consumers, to encode a feature signal that is intended for machine consumers; machine consumers may include, without limitation, any devices and/or components, including without limitation computing devices as described in further detail below. Input signal may be passed, for instance when in hybrid mode, through pre-processor 205.

Still referring to FIG. 2, video encoder 210 may include without limitation any video encoder 210 as described in further detail below. When VCM encoder 202 is in hybrid mode, VCM encoder 202 may send unmodified input video 204 to video encoder 210 and a copy of the same input video 204, and/or input video 204 that has been modified in some way, to feature extractor 215. Modifications to input video 204 may include any scaling, transforming, or other modification that may occur to persons skilled in the art upon reviewing the entirety of this disclosure. For instance, and without limitation, input video 204 may be resized to a smaller resolution, a certain number of pictures in a sequence of pictures in input video 204 may be discarded, reducing framerate of the input video 204, color information may be modified, for example and without limitation by converting an RGB video might be converted to a grayscale video, or the like.

Still referring to FIG. 2, video encoder 210 and feature extractor 215 are connected and might exchange useful information in both directions. For example, and without limitation, video encoder 210 may transfer motion estimation information to feature extractor 220, and vice-versa. Video encoder 210 may provide Quantization mapping and/or data descriptive thereof based on regions of interest (ROI), which video encoder 210 and/or feature extractor 215 may identify, to feature extractor 215, or vice-versa. Video encoder 210 may provide to feature extractor 215 data describing one or more partitioning decisions based on features present and/or identified in input video 204, input signal, and/or any frame and/or subframe thereof; feature extractor 215 may provide to video encoder 210 data describing one or more partitioning decisions based on features present and/or identified in input video 204, input signal, and/or any frame and/or subframe thereof. Video encoder 210 feature extractor 215 may share and/or transmit to one another temporal information for optimal group of pictures (GOP) decisions. Each of these techniques and/or processes may be performed, without limitation, as described in further detail below.

With continued reference to FIG. 2, feature extractor 215 may operate in an offline mode or in an online mode. Feature extractor 215 may identify and/or otherwise act on and/or manipulate features. A "feature," as used in this disclosure, is a specific structural and/or content attribute of data. Examples of features may include SIFT, audio features, color hist, motion hist, speech level, loudness level, or the like. Features may be time stamped. Each feature may be associated with a single frame of a group of frames. Features may include high level content features such as timestamps, labels for persons and objects in the video, coordinates for objects and/or regions-of-interest, frame masks for region-based quantization, and/or any other feature that may occur to persons skilled in the art upon reviewing the entirety of this disclosure. As a further non-limiting example, features may include features that describe spatial and/or temporal characteristics of a frame or group of frames. Examples of features that describe spatial and/or temporal characteristics may include motion, texture, color, brightness, edge count, blur, blockiness, or the like. When in offline mode, all machine models as described in further detail below may be stored at encoder and/or in memory of and/or accessible to encoder. Examples of such models may include, without limitation, whole or partial convolutional neural networks, keypoint extractors, edge detectors, salience map constructors, or the like. When in online mode one or more models may be communicated to feature extractor 220 by a remote machine in real time or at some point before extraction.

Still referring to FIG. 2, feature encoder 225 is configured for encoding a feature signal, for instance and without limitation as generated by feature extractor 215. In an embodiment, after extracting the features feature extractor 215 may pass extracted features to feature encoder 225. Feature encoder 225 may use entropy coding and/or similar techniques, for instance and without limitation as described below, to produce a feature stream, which may be passed to multiplexor 230. Video encoder 210 and/or feature encoder 225 may be connected via optimizer 220; optimizer 220 may exchange useful information between the video encoder 210 and feature encoder 225. For example, and without limitation, information related to codeword construction and/or length for entropy coding may be exchanged and reused, via optimizer 220, for optimal compression.

In an embodiment, and continuing to refer to FIG. 2, video encoder 210 may produce a video stream; video stream may be passed to multiplexor 230. Multiplexor 230 may multiplex video stream with a feature stream generated by feature encoder 225; alternatively or additionally, video and feature bitstreams may be transmitted over distinct channels, distinct networks, to distinct devices, and/or at distinct times or time intervals (time multiplexing). Each of video stream and feature stream may be implemented in any manner suitable for implementation of any bitstream as described in this disclosure. In an embodiment, multiplexed video stream and feature stream may produce a hybrid bitstream, which may be is transmitted as described in further detail below.

Still referring to FIG. 2, where VCM encoder 202 is in video mode, VCM encoder 202 may use video encoder 210 for both video and feature encoding. Feature extractor 215 may transmit features to video encoder 210; the video encoder 210 may encode features into a video stream that may be decoded by a corresponding video decoder 250. It should be noted that VCM encoder 202 may use a single video encoder 210 for both video encoding and feature encoding, in which case it may use different set of parameters for video and features; alternatively, VCM encoder 202 may two separate video encoders 210, which may operate in parallel.

Still referring to FIG. 2, system 200 may include and/or communicate with, a VCM decoder 240. VCM decoder 240 and/or elements thereof may be implemented using any circuitry and/or type of configuration suitable for configuration of VCM encoder 202 as described above. VCM decoder 240 may include, without limitation, a demultiplexor 245. Demultiplexor 245 may operate to demultiplex bitstreams if multiplexed as described above. For instance and without limitation, demultiplexor 245 may separate a multiplexed bitstream containing one or more video bitstreams and one or more feature bitstreams into separate video and feature bitstreams.

Continuing to refer to FIG. 2, VCM decoder 240 may include a video decoder 250. Video decoder 250 may be implemented, without limitation in any manner suitable for a decoder as described in further detail below. In an embodiment, and without limitation, video decoder 250 may generate an output video, which may be viewed by a human or other creature and/or device having visual sensory abilities.

Still referring to FIG. 2, VCM decoder 240 may include a feature decoder 255. In an embodiment, and without limitation, feature decoder 255 may be configured to provide one or more decoded data to a machine. Machine may include, without limitation, any computing device as described below, including without limitation any microcontroller, processor, embedded system, system on a chip, network node, or the like. Machine may operate, store, train, receive input from, produce output for, and/or otherwise interact with a machine model as described in further detail below. Machine may be included in an Internet of Things (IOT), defined as a network of objects having processing and communication components, some of which may not be conventional computing devices such as desktop computers, laptop computers, and/or mobile devices. Objects in IoT may include, without limitation, any devices with an embedded microprocessor and/or microcontroller and one or more components for interfacing with a local area network (LAN) and/or wide-area network (WAN); one or more components may include, without limitation, a wireless transceiver, for instance communicating in the 2.4-2.485 GHz range, like BLUETOOTH transceivers following protocols as promulgated by Bluetooth SIG, Inc. of Kirkland, Wash. and/or network communication components operating according to the MODBUS protocol promulgated by Schneider Electric SE of Rueil-Malmaison, France and/or the ZIGBEE specification of the IEEE 802.15.4 standard promulgated by the Institute of Electronic and Electrical Engineers (IEEE). Persons skilled in the art, upon reviewing the entirety of this disclosure, will be aware of various alternative or additional communication protocols and devices supporting such protocols that may be employed consistently with this disclosure, each of which is contemplated as within the scope of this disclosure.

With continued reference to FIG. 2, each of VCM encoder 202 and/or VCM decoder 240 may be designed and/or configured to perform any method, method step, or sequence of method steps in any embodiment described in this disclosure, in any order and with any degree of repetition. For instance, each of VCM encoder 202 and/or VCM decoder 240 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Each of VCM encoder 202 and/or VCM decoder 240 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

The present systems and methods are based on a machine learning architecture that supports multiple tasks for the end users. Most common machine learning architectures used today are neural networks. One of the shortcomings of simple, single-task neural networks is time complexity and computational cost of training. To achieve high performance, neural networks typically must be trained using very large datasets with hundreds of thousands and sometimes millions of samples such as images and videos. Training a separate network each time a new use case arises can be highly redundant and resource wasteful. Therefore, methods have been developed to reuse already trained portions of neural networks for multiple tasks. By training one part of the network to support multiple tasks, users can save storage space, computational power, and reduce energy consumption.

Figure 3:
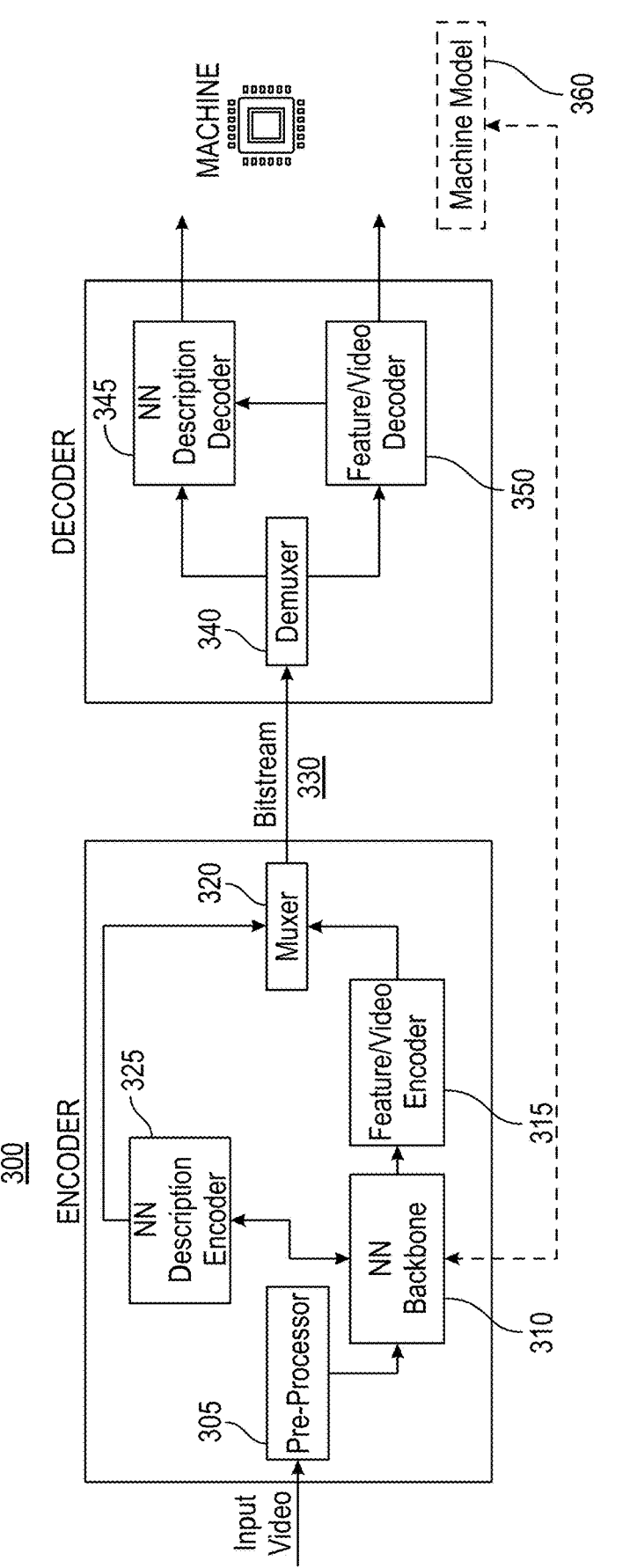
FIG. 3 is a block diagram illustrating an exemplary embodiment of a system for adaptive neural network optimization for multiple task feature coding.

FIG. 3 is a block diagram illustrating an exemplary embodiment of a system for adaptive neural network optimization for multiple task feature coding; system may be used in a method for adaptive neural network optimization that can be used for multiple task feature coding in systems that implement standards such as Video Coding for Machines (VCM), or any other system that is implementing neural networks for image and video processing by machines, such as Internet of Things (IoT).

Typically, an input image or video is passed through the encoder 300 that extracts the relevant features. The encoder 300 includes a preprocessor 305 that is coupled to a neural network backbone (NNB) 310, the output of which is a set of features that can be further compressed using feature or video encoder 315. The NNB 310 may also receive input and/or training data from a machine model 360. The output of video encoder 315 is a feature substream. In addition to the features, the description of the NNB 310 can be compressed and a description substream may be combined in multiplexor 320 with the feature substream from a neural network description encoder 325 to form the bitstream 330.

Bitstream 330 is sent over a channel to a decoder 335 which decodes/decompresses the two substreams and produces the NNB description as well as a feature set. The bitstream 330 is received by a demuxer 340 which parses the bitstream into an NNB description substream applied to neural network description decoder 345 and a feature set substream which is applied to a feature/video decoder 350. End user (machine) 355 receives the feature set and passes it as an input to the neural network head (NNH), which at the output produces decisions related to the task or tasks that are conducted by the machine. This is possible in cases, for example, where the complete neural network (NN) is pre-trained and the parameters of the NNB are known and not changed.

Figure 4:
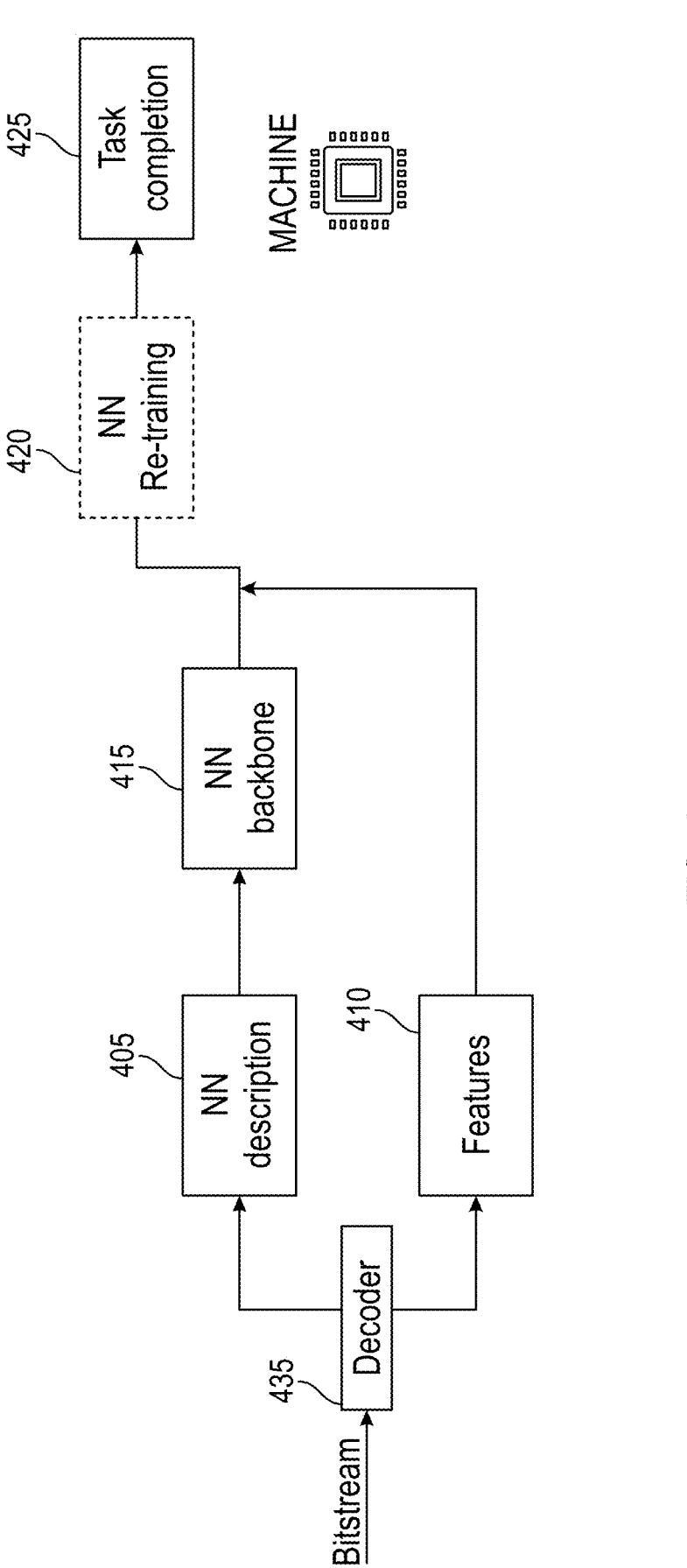
FIG. 4 is a block diagram illustrating an exemplary embodiment of a machine process with decoder outputs as inputs for the task completion.

FIG. 4 is a block diagram illustrating an exemplary embodiment of a machine process with the outputs of decoder serving as inputs for the task completion 425. In cases where the NNB 415 is not trained by the machine and the parameters of NNB 415 are not known, the machine receives the NNB description from the decoder 435 and reconstructs the complete NN backbone 415, and optionally conducts fine tuning of the NNH, either to align with the NNB, or to support additional tasks that were not included in the original NNB training. Here, NN re-training (NNH fine tuning) is an optional step 420.

If machine 455 knows the complete NN, such as by knowing all NNB parameters, the NNB description does not need to be transmitted to the decoder. In this case the bitstream may only contain the feature substream 410.

To facilitate flexibility on the encoder side, in cases when the tasks need to be changed, or the parameters of the current task need to be changed, the machine can send the NNB description to the encoder side which aligns with the pertinent machine model. This is depicted in FIG. 1.

Together with the NNB description, decoder may send a time interval for which the given NNB description is valid. After expiration of the time interval the NNB description reverts to the previous one or the default one.

On the encoder side, the feature/video encoder can be implemented using the existing video and feature standards such as Versatile Video Coding (VVC), High Efficiency Video Coding (HEVC), AOMedia Video 1 (AV1), Compact Descriptors for Video Analysis (CDVA), or similar.

The NN description encoder can be implemented using simple techniques such as Variable Length Coding (VLC), or the more advanced standards such as Neural Network Compression and Representation (NNR), or similar.

FIG. 5 is a block diagram of an exemplary embodiment of a bitstream structure. Stream-level header 505 contains high level syntax describing the presence of the substreams and contains parameters of such substreams, such as length, duration, format, etc. This information is used by the parser in the decoder to extract substreams. Feature substream 510 contains feature stream header 515 which describes the feature stream payload 520 in terms of length, format, and other pertinent parameters. Feature stream header 515 is used by the feature decoder to extract and decode the feature stream payload 520.

NN description substream 525 contains the NN description header 530 which contains parameters describing the length, format, and type of the NN description payload 535. Alternatively, instead of the complete description of all NN parameters, the encoder can signal the index of the used NN in the look-up table or a list that is predetermined and agreed upon. This list can be maintained by a central registration authority which updates it and signals the updates to the end users. NN description header is used by the feature decoder to extract and decode the NN description payload.

Depending on the level of abstraction and cross-task generalization, the splitting point between the NNH and NNB can be adaptively selected. Also, when NN is trained for multiple tasks and use cases, parts of it can be mostly or fully related to concrete tasks, while other parts might be mostly or fully redundant for a concrete task. In the following paragraphs we are presenting two techniques for adaptive optimization: vertical optimization (task-specific ablation) and horizontal optimization (computational offloading).

Figure 6:
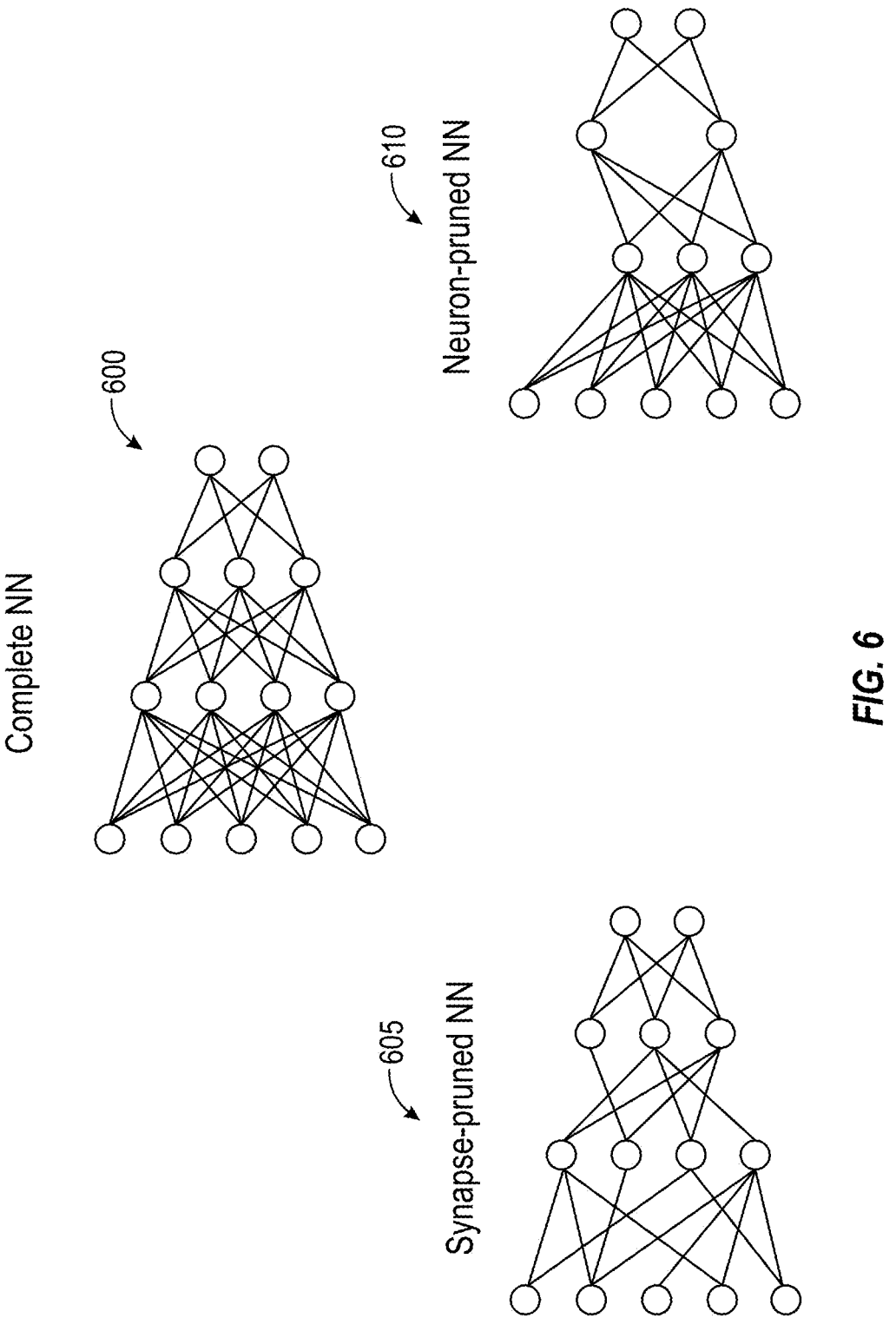
FIG. 6 is a schematic diagram illustrating exemplary embodiments of pruned neural networks.

FIG. 6 is a schematic diagram illustrating exemplary embodiments of pruned neural networks; such embodiments may implement vertical optimization and/or task-specific ablation The technique of ablation or pruning has been well established in the machine learning literature with a specific focus on the neural networks (reference: Newell, Allen (1975). D. Raj Reddy (ed.). A Tutorial on Speech Understanding Systems. In Speech Recognition: Invited Papers Presented at the 1974 IEEE Symposium. New York: Academic.). Using this approach, parts of the neural network can be removed when training for a specific task. By pruning neurons or connections (synapses), a single NN can be optimized to support multiple tasks. Examples of pruning are given in FIG. 6, which illustrates a complete neural network 600, an exemplary synapse pruned neural network 605 and an exemplary neuron pruned neural network 610.

Using information-theoretic ideas, a class of practical and nearly optimal schemes for adapting the size of a neural network has been developed. By removing less important weights from a network, several improvements can be expected: better generalization, fewer training examples required, and improved speed of learning and/or classification. The method may use second-derivative information to make a tradeoff between network complexity and training set error.

As an example, part of the neural network can be trained for object detection and another part for object tracking, or segmentation. On a lower level, part of the network can be trained for detecting one class of objects (ex. Persons), while another part can be trained for detecting another class of objects (ex. Cars).

Figure 7:
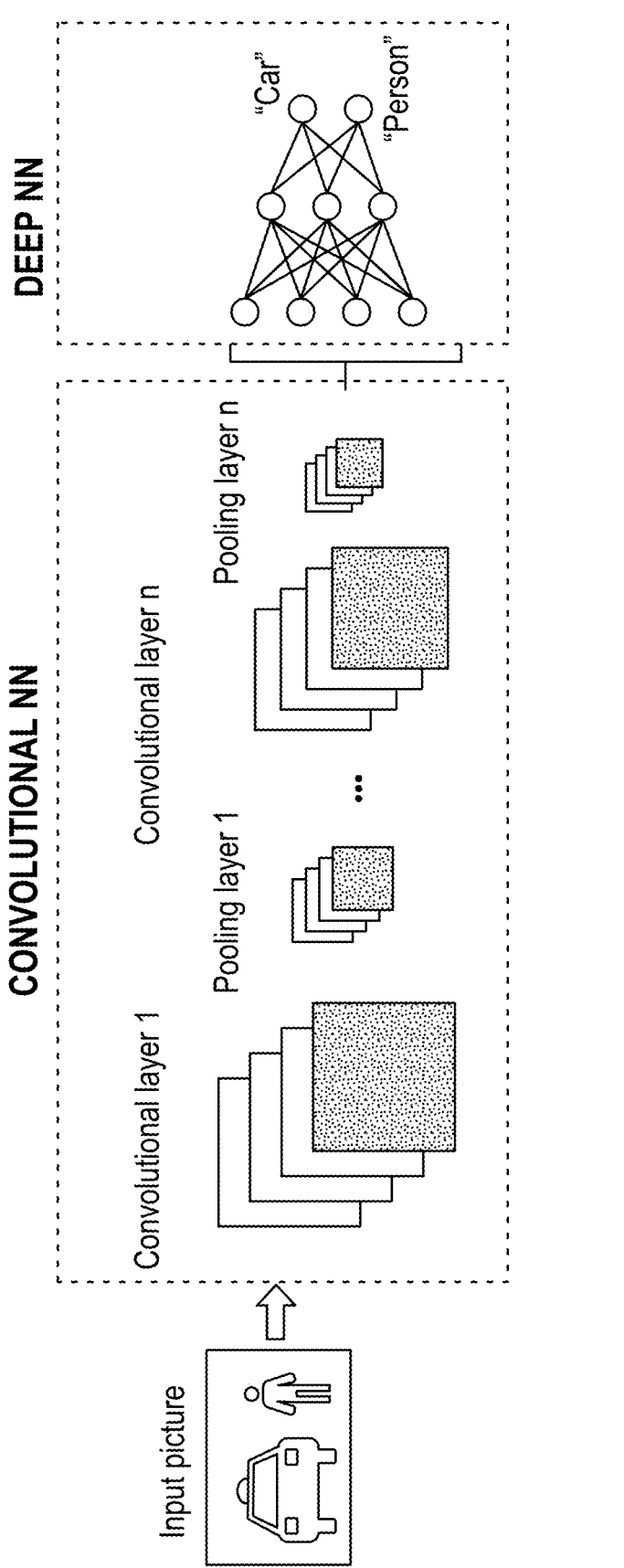
FIG. 7 is a schematic diagram illustrating an exemplary embodiment of a complete neural network.

FIG. 7 is a schematic diagram illustrating an exemplary embodiment of a complete neural network. Computational complexity of the encoder is linearly dependent on the size of the NNB. While the vertical optimization can, in some cases, reduce the amount of computation in the NNB, the split point between the NNB and NNH is the main tool for computational offloading. The split point needs to be selected based on the criteria of energy consumption, computational capabilities as well as the bandwidth between the encoder and the decoder. The example of the NN is depicted in FIG. 7. An example of the splitting options is depicted in FIG. 8.

Figure 8:
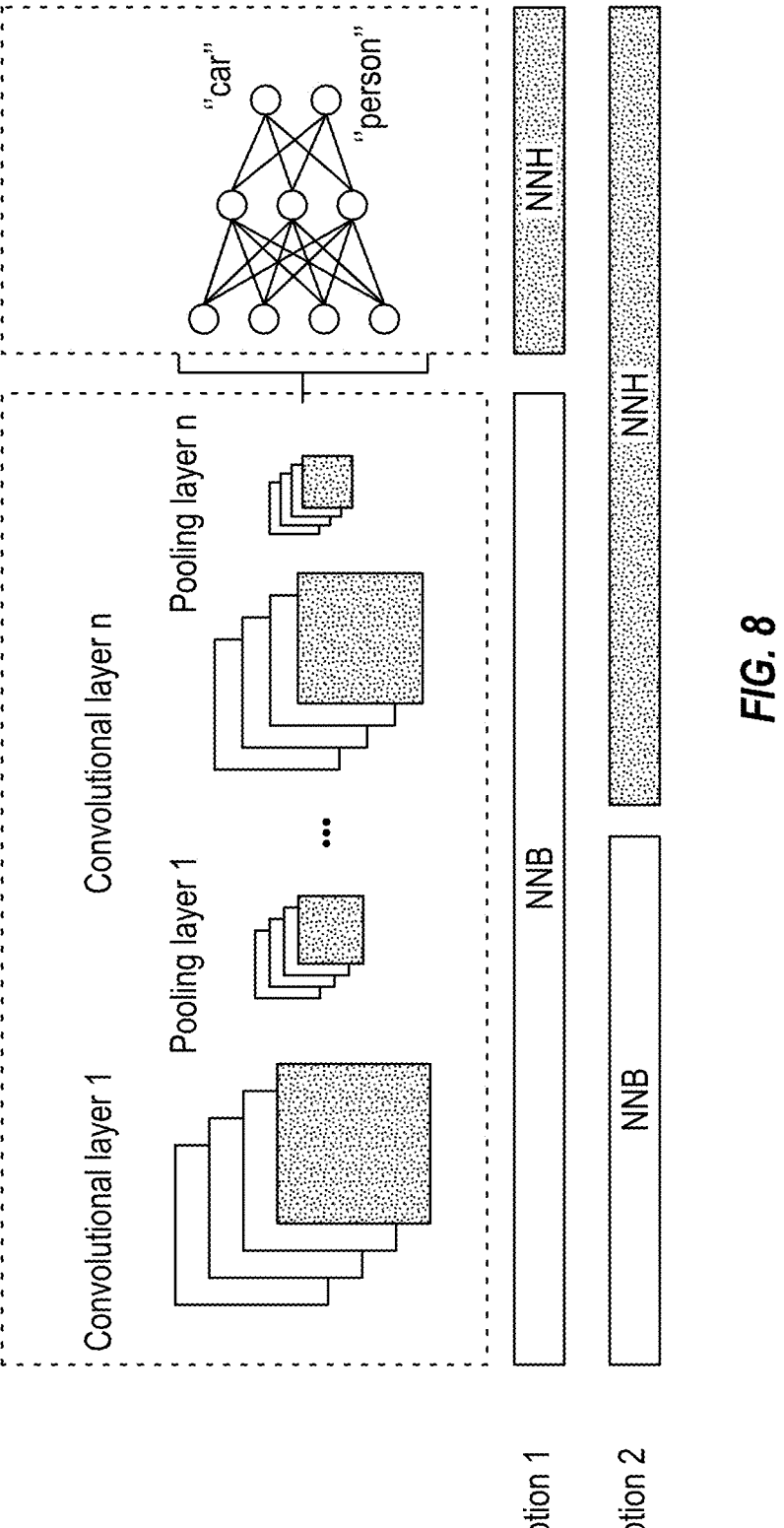
FIG. 8 is a schematic diagram illustrating two exemplary embodiments of NNG-NNH split points.

FIG. 8 is a schematic diagram illustrating two exemplary embodiments of NNB-NNH split points. In option 1, the split point is selected at a later stage in the NN, resulting in a relatively smaller size of the feature set. However, the benefit of having smaller feature set and hence a smaller feature substream comes at a cost of a larger NN description and higher computational complexity on the encoder side.

In option 2, the split point is selected at a lower layer of the NN, producing a very small NNB and hence requiring minimal computational cost on the encoder side, as well as a minimal NN description substream. However, this comes at a cost of a larger feature substream.

The tradeoffs of different options need to be carefully considered with optimal implementation that varies with different use cases, based on the cross-task similarity and computational/energy requirements.

Alternatively, an encoder can automatically decide to implement vertical and/or horizontal optimization based on the available data that it gathers from the environment or receives from the decoder.

Systems and methods described in this disclosure may be implemented together with and/or interact with any systems, system components, methods, and/or method steps described in PCT application PCT/US22/53579 filed on Dec. 22, 2022 and titled "INTELLIGENT MULTI-STREAM VIDEO CODING FOR VIDEO SURVEIL-LANCE," the entirety of which is incorporated herein by reference.

Autoencoder

This disclosure further describes a framework for video coding for machines (VCM) that contains an autoencoder (AE) as a feature coding and decoding element. The auto-encoder described herein can be taken as a special case of the general neural network as described above, with some modifications.

Figure 9:
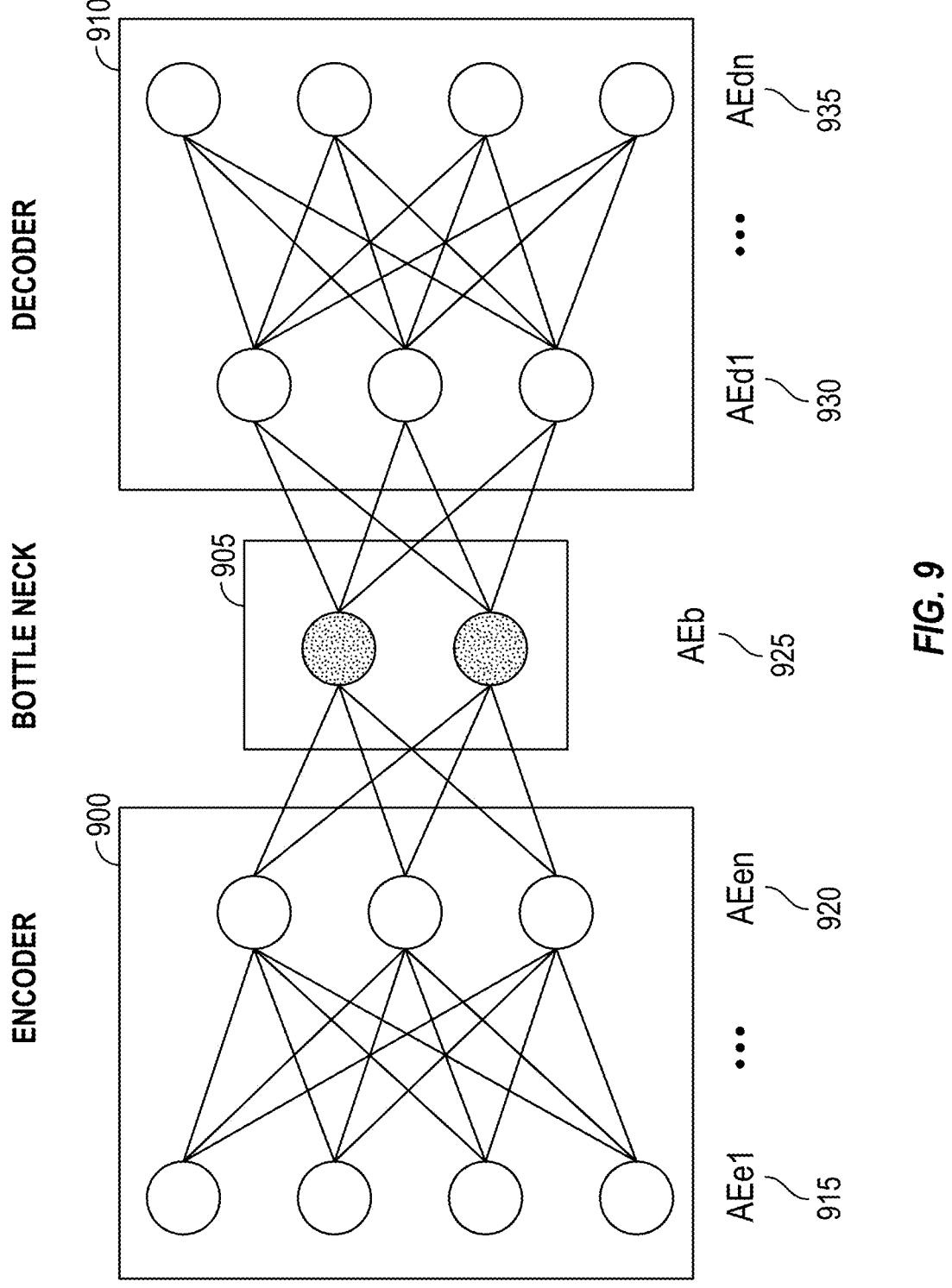
FIG. 9 is a simplified schematic diagram illustrating an exemplary autoencoder topology in accordance with the present disclosure.

Referring to FIG. 9, the AE can generally be described in three parts. A first part of the AE, the AE encoder 900, is preferably implemented on the encoder side of the VCM (which can be implemented on the edge node or similar remote site/device). Second part of the AE, the AE decoder 910, is preferably implemented as part of the VCM decoder (which can be implemented on the central server or similar centralized site/device). In an exemplary embodiment, the shared part of the AE, the bottleneck 905, is present at both sites/devices. In one embodiment disclosed herein, all or substantially all of the features and AE updates are communicated between the encoder and the decoder using a bit-stream.

Autoencoder (AE) is a type of an unsupervised neural network that learns how to efficiently compress and encode high-dimensional input data and then learns how to recon-struct/decode the data back from the reduced encoded rep-resentation to a representation that is as close to the original input as possible. In some instances, the AE can reduce data dimensions by learning how to ignore the noise in the data. The noise is defined as redundant data in the task-specific sense. For example, a network that detects human faces may learn to preserve portions of the input signal that contain faces and discard the rest of the input information. As such, AE is suitable for various applications in visual signal processing and has been used as such for some time, as described in Transforming Auto-encoders, Hinton, G. E., Krizhevsky, A., & Wang, S. D. (2011, June), International conference on Artificial Neural Networks (pp. 44-51). Springer, Berlin, Heidelberg.

Again referring to FIG. 9, the AE network generally has three primary high level components: the AE encoder 900, an AE bottleneck 905, and the AE decoder 910. Using backpropagation, the unsupervised algorithm continuously trains AE by setting the target output values to be as close to the inputs as possible, with the allowed loss threshold. This forces the usually smaller AE bottleneck to use dimen-sional reduction to reduce or eliminate noise.

A typical implementation of the AE has a same number of layers (n) in the encoder 900 and the decoder 910, and the number of neurons in those layers is generally significantly higher than the number of neurons in the bottleneck layer 905.

Layers AEe1 915 to AEen 920 belong to the AE encoder 900 and typically have decreasing number of neurons in each subsequent layer. Layer AEb 925 is the only layer in the AE bottleneck layer 905 and it typically has fewer neurons than the layer AEen 920. Layers AEd1 930 to AEdn 935 belong to the AE decoder 910 and typically have increasing number of neurons in each subsequent layer. For processing of the visual information, the pre-processed image is passed to the input layer AEe1 915 and subsequently transformed to the lower-dimensional representation in each layer. The encoding transformations result in the bottleneck, so called "latent", representation. This latent representation is taken by the input layer of the decoder, AEd1 930, and subse-quently expanded and transformed into a close reconstruc-tion of the original image that is the output of the AEdn layer 935.

The problem that AE is solving in general is learning the functions A: Rn->Rp (encoder) and B: Rp->Rn (decoder), such that $$\text{argmin}_{A,B} E[\Delta(x, B \circ A(x))],$$

where E is the expectation over the distribution of x, and Δ is the reconstruction loss function, which measures the distance between the output of the decoder and the input of AE. Usually, the l2 norm is used for the loss function.

In the framework of the VCM, the input to the AE is typically an image or a video from the source such as camera, and the output is the reconstruction of this image that is smaller in terms of the bandwidth than the input image. This reconstructed image should yield same or similar results as the original image when passed through the task neural network.

The loss of the task neural network is preferably added to the loss function of the AE in the training phase to achieve optimal parameters of the AE. The acceptable level of overall loss will determine the amount of compression that is achievable by the AE. This tradeoff framework allows VCM encoder to increase or decrease the amount of com-pression based on the conditions, such as the type of the task, the task priority level, bandwidth conditions of the commu-nication network, etc.

During training, connections and neurons of the AE can be further optimized and sparsified, for example by a prun-ing process described herein, such as in connection with FIG. 6. Pruned network has smaller footprint and in some cases might achieve even a higher compression compared to the full network.

VCM AE Framework

Figure 10:
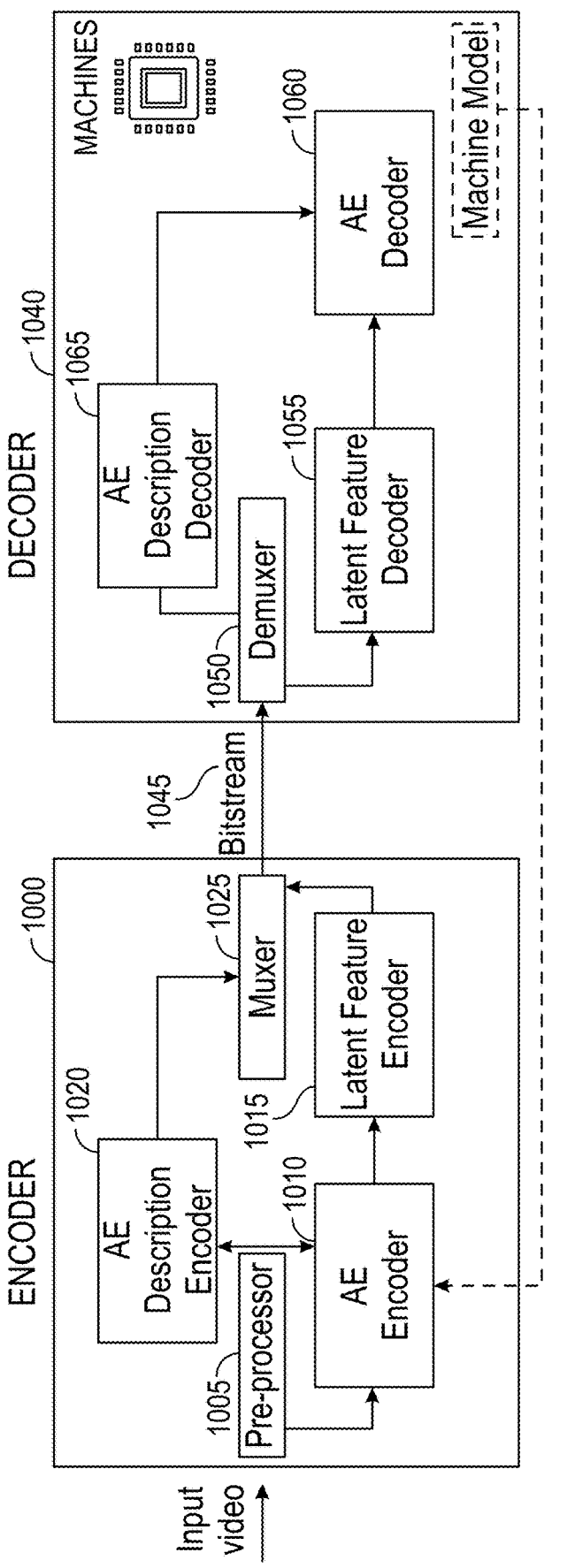
FIG. 10 is a block diagram illustrating an exemplary embodiment of a system for video coding for machines with an autoencoder for task feature coding

Given an AE that is pre-trained for a specific task, we can split the AE encoder 900 and the AE decoder 910 and implement them in the VCM encoder and the VCM decoder. One such implementation is depicted in FIG. 10.

VCM encoder takes in the input image or video, for example from the camera, and passes it through the pre-processor unit 1005 which converts given input to the appropriate format. Examples of pre-processing are: color conversion from the camera output to the RGB color-space for the typical AE encoder input; image or frame downscaling from the high-definition resolution to the lower resolution typically accepted by the AE encoder; video framerate reduction for more efficient processing by the AE encoder; etc.

Pre-processed image/video is then passed through the AE encoder 1010, which has the bottleneck AEb layer 925 (FIG. 9) as a last layer. The output of the AEb layer 925 is then further encoded using the latent feature encoder (LFE) 1015, which uses statistical coding such as entropy coding, variable-length coding, or some other type of general coding structure that allows tradeoff between the compression level and the information loss, to further compress the feature stream. If any modifications to the AE encoder are necessary to support the given input signal, those modifications are encoded using the AE description encoder 1020 which uses similar statistical or other general coding techniques to encode modification to the AE encoder 1010. Examples of such modifications are changes to the connection weights, changes to the activation functions for the neurons, and pruning operations on the network elements.

VCM encoder might decide in the adaptive mode to further modify the AE encoder to facilitate optimal operation based on the conditions, such as the type of the task, the task priority level, bandwidth conditions of the communication network, etc.

The encoded AE description is then multiplexed (muxed) 1025 with the encoded latent features into bitstream that is sent to the decoder.

Besides the autonomous modification of the AE encoder, the VCM encoder 1000 can receive a signal from the decoder or some other source with the updated machine model. This modification is then implemented in the AE encoder 1010 and no further information is needed to be sent back to the decoder. A reason for such update can be change of the task that is completed on the decoder side. For example, the decoder 1040 might be repurposed from detecting human faces to detecting some other objects, or the type of the task can be changed, for example from object detection to image segmentation, or object tracking, etc.

Decoder

VCM decoder 1040 receives the bitstream 1045 and passes it through the demuxer 1050, which uses a bitstream parser to extract and split the latent feature stream and the AE description stream. Subsequently, those streams are passed through the appropriate decoders. The latent feature decoder 1055 takes the latent feature stream and passes it to the layer AEd1 930 of AE decoder 1060, and subsequently to other decoder layers, finally producing the image or video reconstruction at the output. The AE description decoder 1065 applies the inverse operation of the AE description encoder and produces the description of the AE encoder modifications.

Figure 11:
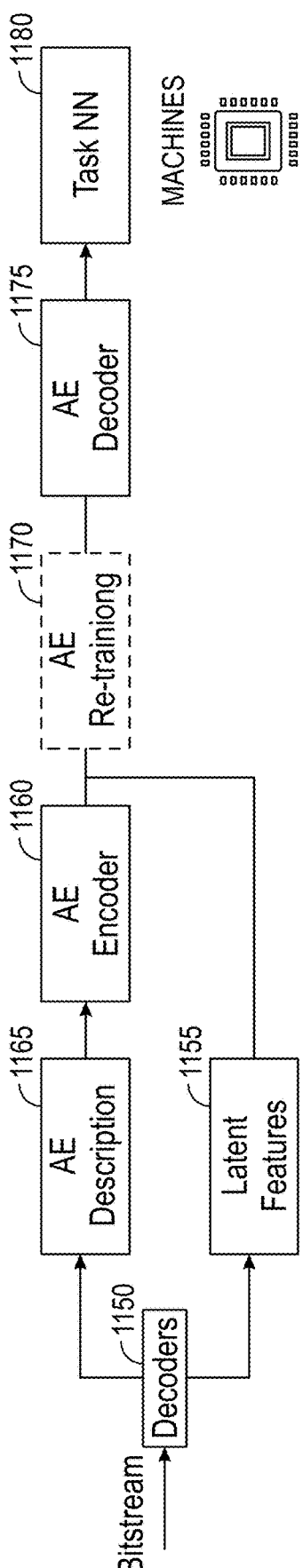
FIG. 11 is a block diagram illustrating an exemplary embodiment of a machine process, including an autoencoder, with decoder outputs as inputs for the task completion.

The layout of the components of the VCM decoder 1040 is further illustrated in FIG. 11

If the AE encoder made modifications and the AE description is present in the bitstream, the decoder applies the described modifications to the instance of the original AE encoder that is stored at the decoder site. Upon the application of the required modifications, the whole AE might need to be retrained 1170 in order to obtain optimal parameters for the AE decoder. After the re-training 1170 the latent features are passed through the updated AE decoder 1175 to obtain the desired output representation of the original input image.

This representation is then passed by the machine to the task neural network 1180 which completes the desired task. The performance of the task NN 1180 with the AE image reconstruction should preferably be the same, or similar to, the degree of the predetermined threshold, to the performance of the task NN with the original image as an input.

To achieve the desired threshold of performance, the AE and the Task NN can be jointly trained, in a manner similar to the method of joint training described in our prior application, PCT/US22/40722, entitled SYSTEMS AND METHODS FOR JOINT OPTIMIZATION TRAINING, which is hereby incorporated by reference in its entirety, where the rate-distortion optimizer would be replaced by the ordinary loss function of the task NN.

Bitstream

The bitstream that is produced by the VCM encoder 1000 contains the feature substream and the AE description substream, as depicted in FIG. 12. Either one of the substreams can be empty. The presence of the substreams as well as the length and type of the present substreams are described by the parameters in the Stream-level header 1205.

The feature substream contains the feature stream header 1210 that describes the elements of the feature stream and the feature stream payload 1215 that contains binary representation of the latent features. Feature stream header 1210 contains parameters that describe type and length of the latent feature elements.

The AE description substream contains the AE description stream header 1220 that describes the elements of the AE description stream and the AE description stream payload 1225 that contains binary representation of the modifications to the AE encoder. AE description stream header contains parameters that describe type and length of the AE description elements.

If the decoder doesn't have full description of the pre-trained AE encoder, the encoder can signal the description to the decoder using the standard indexed table entries and network descriptions such as the Open Neural Network Exchange (ONNX). This saves bandwidth and removes a need to send the complete network description as part of the bitstream.

Figure 13:
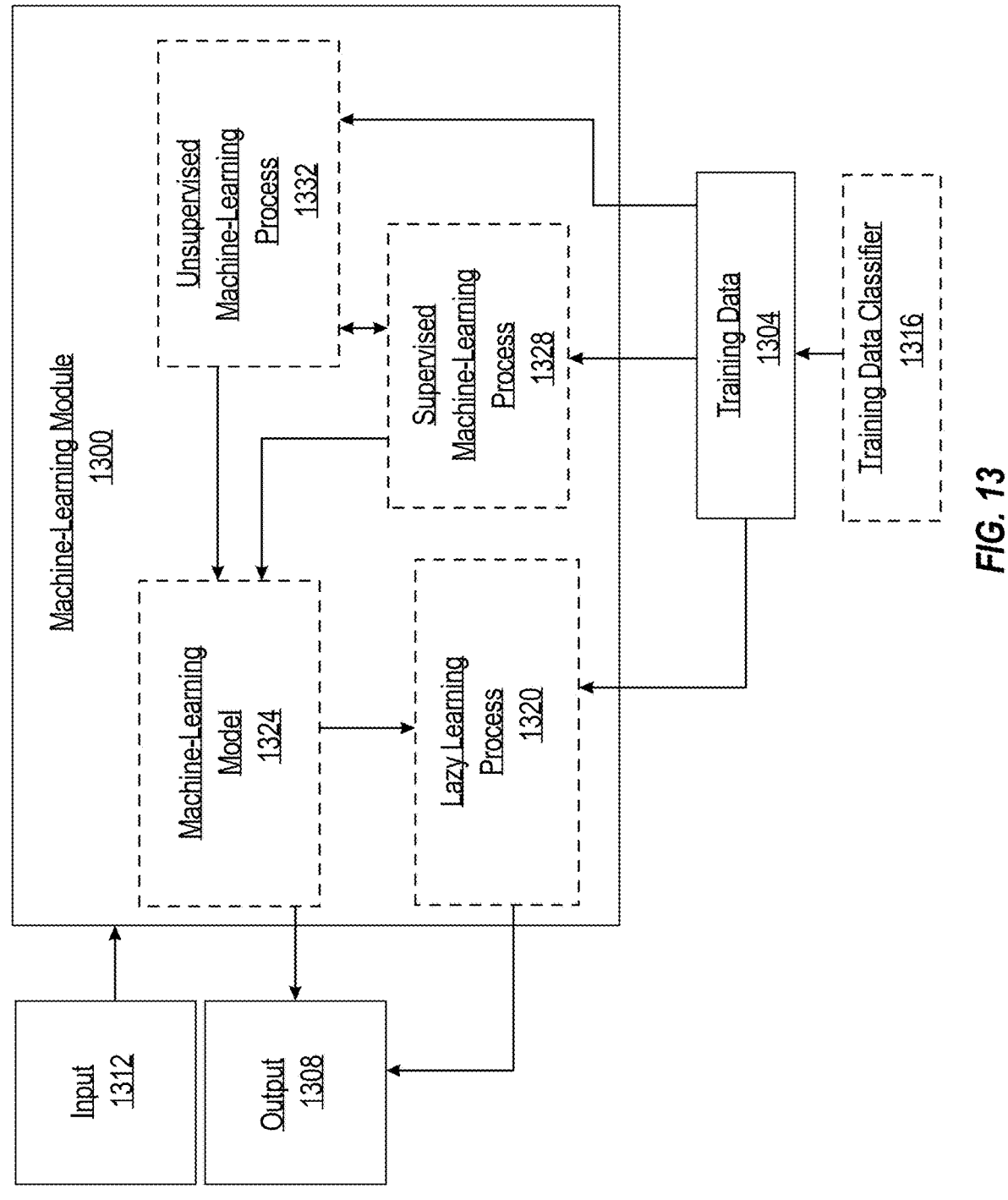
FIG. 13 is a block diagram illustrating an exemplary embodiment of a machine-learning module.

Referring now to FIG. 13, an exemplary embodiment of a machine-learning module 1300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1304 to generate an algorithm that will be performed by a computing device/module to produce outputs 908 given data provided as inputs 1312; this is in contrast to a non-machine learning software program where the commands to be executed are determined in advance by a user and written in a programming language.

Still referring to FIG. 13, "training data," as used herein, is data containing correlations that a machine-learning process may use to model relationships between two or more categories of data elements. For instance, and without limitation, training data 1304 may include a plurality of data entries, each entry representing a set of data elements that were recorded, received, and/or generated together; data elements may be correlated by shared existence in a given data entry, by proximity in a given data entry, or the like. Multiple data entries in training data 1304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1304 according to various correlations; correlations may indicate causative and/or predictive links between categories of data elements, which may be modeled as relationships such as mathematical relationships by machine-learning processes as described in further detail below. Training data 1304 may be formatted and/or organized by categories of data elements, for instance by associating data elements with one or more descriptors corresponding to categories of data elements. As a non-limiting example, training data 1304 may include data entered in standardized forms by persons or processes, such that entry of a given data element in a given field in a form may be mapped to one or more descriptors of categories. Elements in training data 1304 may be linked to descriptors of categories by tags, tokens, or other data elements; for instance, and without limitation, training data 1304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 13, training data 1304 may include one or more elements that are not categorized; that is, training data 1304 may not be formatted or contain descriptors for some elements of data. Machine-learning algorithms and/or other processes may sort training data 1304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 904 to be made applicable for two or more distinct machine-learning algorithms as described in further detail below. Training data 1304 used by machine-learning module 1300 may correlate any input data as described in this disclosure to any output data as described in this disclosure. As a non-limiting illustrative example Further referring to FIG. 13, training data may be filtered, sorted, and/or selected using one or more supervised and/or unsupervised machine-learning processes and/or models as described in further detail below; such models may include without limitation a training data classifier 1316. Training data classifier 1316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1300 may generate a classifier using a classification algorithm, defined as a process whereby a computing device and/or any module and/or component operating thereon derives a classifier from training data 1304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 13, machine-learning module 1300 may be configured to perform a lazy-learning process 1320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1304. Heuristic may include selecting some number of highest-ranking associations and/or training data 1304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 13, machine-learning processes as described in this disclosure may be used to generate machine-learning models 1324. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1324 may be generated by creating an artificial neural network, such as a convolutional neural network comprising an input layer of nodes, one or more intermediate layers, and an output layer of nodes. Connections between nodes may be created via the process of "training" the network, in which elements from a training data 1304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 13, machine-learning algorithms may include at least a supervised machine-learning process 1328. At least a supervised machine-learning process 1328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1304. Persons skilled in the art, upon reviewing the entirety of this disclosure, will be aware of various possible variations of at least a supervised machine-learning process 928 that may be used to determine relation between inputs and outputs. Supervised machine-learning processes may include classification algorithms as defined above.

Further referring to FIG. 13, machine learning processes may include at least an unsupervised machine-learning processes 1332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 13, machine-learning module 1300 may be designed and configured to create a machine-learning model 1324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 13, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 14:
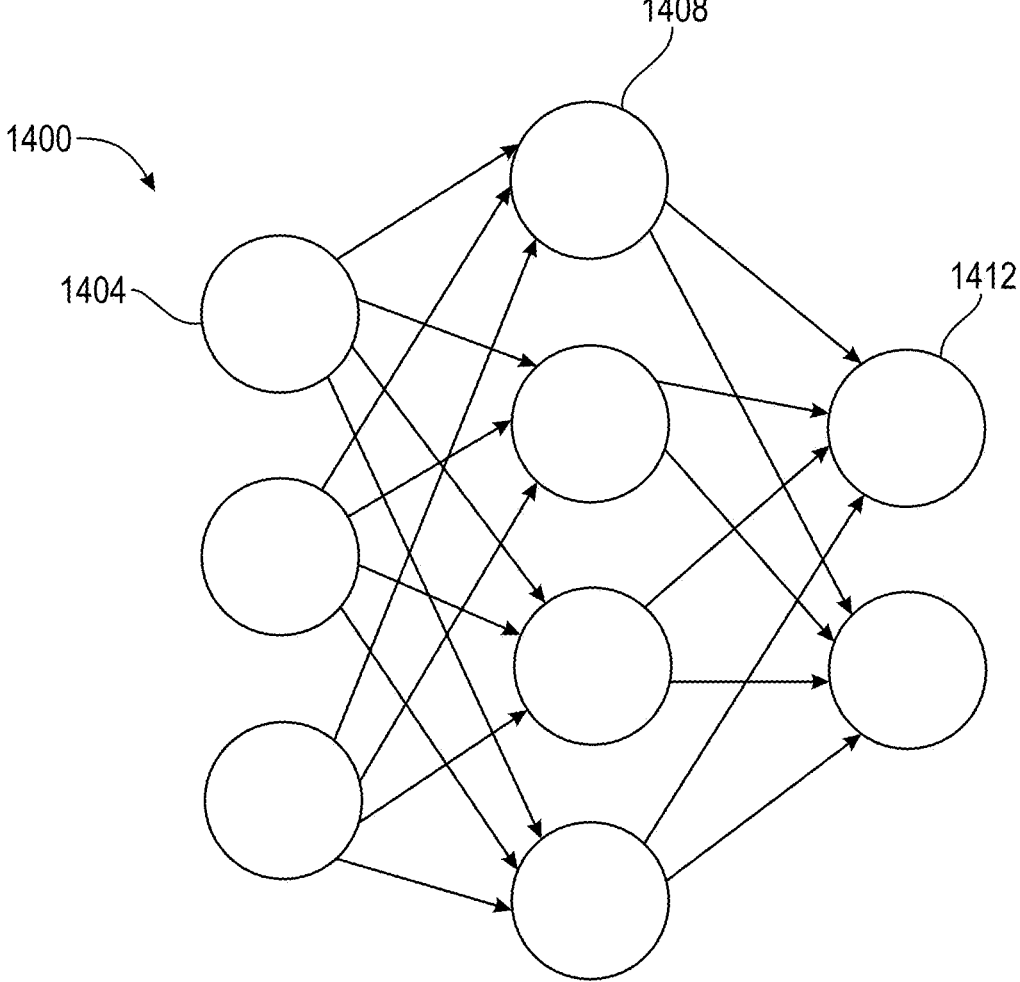
FIG. 14 is a schematic diagram illustrating an exemplary embodiment of neural network.

Referring now to FIG. 14, an exemplary embodiment of neural network 1400 is illustrated. A neural network 1400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network."

Figure 15:
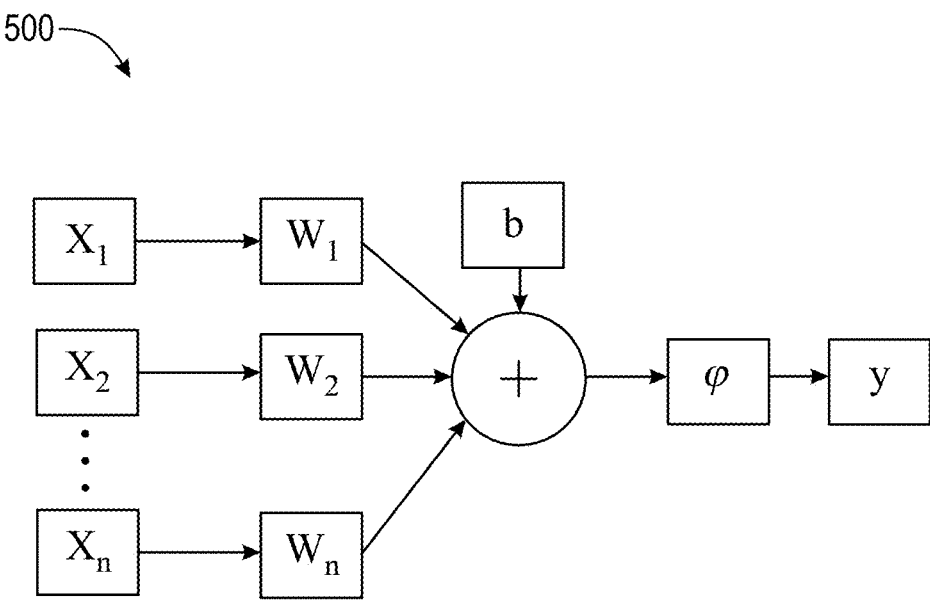
FIG. 15 is a schematic diagram illustrating an exemplary embodiment of a node of a neural network

Referring now to FIG. 15, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 15, a "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like. CNN may include, without limitation, a deep neural network (DNN) extension, where a DNN is defined as a neural network with two or more hidden layers.

Figure 16:
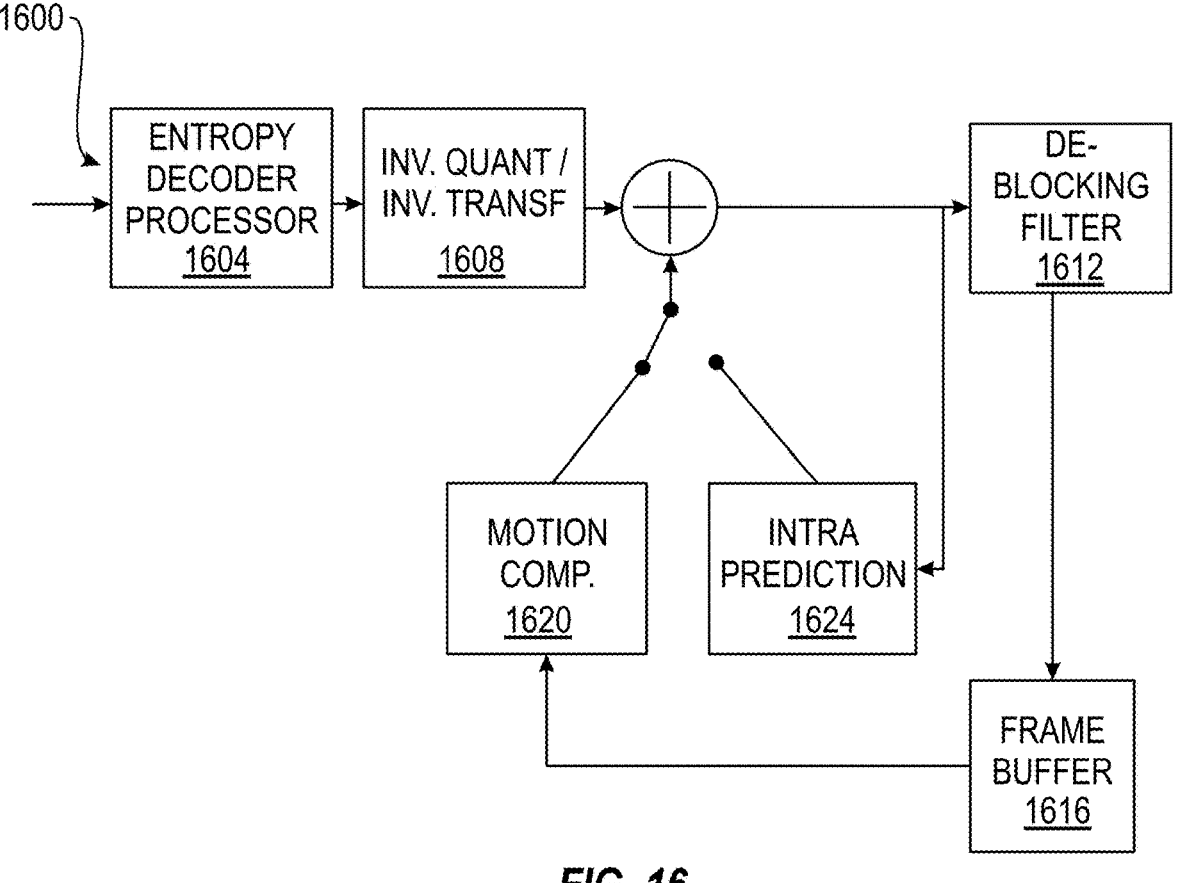
FIG. 16 is a block diagram illustrating an exemplary embodiment of a video decoder.

FIG. 16 is a system block diagram illustrating an example decoder 1600 capable of adaptive cropping. Decoder 1600 may include an entropy decoder processor 1604, an inverse quantization and inverse transformation processor 1608, a deblocking filter 1612, a frame buffer 1616, a motion compensation processor 1620 and/or an intra prediction processor 1624.

In operation, and still referring to FIG. 16, bit stream 1628 may be received by decoder 1600 and input to entropy decoder processor 1604, which may entropy decode portions of bit stream into quantized coefficients. Quantized coefficients may be provided to inverse quantization and inverse transformation processor 1608, which may perform inverse quantization and inverse transformation to create a residual signal, which may be added to an output of motion compensation processor 1620 or intra prediction processor 1624 according to a processing mode. An output of the motion compensation processor 1620 and intra prediction processor 1624 may include a block prediction based on a previously decoded block. A sum of prediction and residual may be processed by deblocking filter 1612 and stored in a frame buffer 1616.

In an embodiment, and still referring to FIG. 16 decoder 1600 may include circuitry configured to implement any operations as described above in any embodiment as described above, in any order and with any degree of repetition. For instance, decoder 1600 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Decoder may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 17:
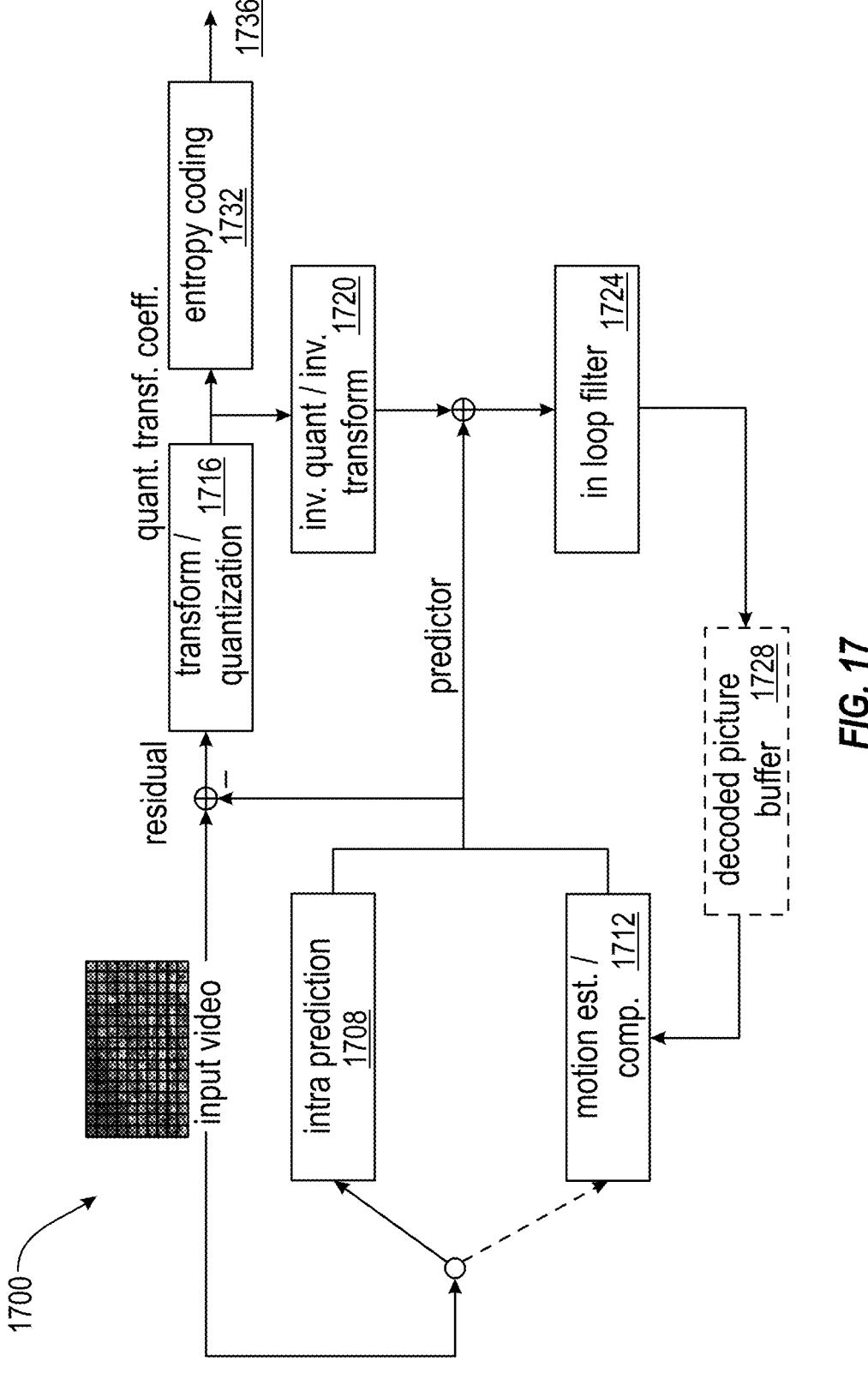
FIG. 17 is a block diagram illustrating an exemplary embodiment of a video encoder.

FIG. 17 is a system block diagram illustrating an example video encoder 1700 suitable for VCM encoding. Example video encoder 1700 may receive an input video 1704, which may be initially segmented or dividing according to a processing scheme, such as a tree-structured macro block partitioning scheme (e.g., quad-tree plus binary tree). An example of a tree-structured macro block partitioning scheme may include partitioning a picture frame into large block elements called coding tree units (CTU). In some implementations, each CTU may be further partitioned one or more times into a number of sub-blocks called coding units (CU). A final result of this portioning may include a group of sub-blocks that may be called predictive units (PU). Transform units (TU) may also be utilized.

Still referring to FIG. 17, example video encoder 1700 may include an intra prediction processor 1708, a motion estimation/compensation processor 1712, which may also be referred to as an inter prediction processor, capable of constructing a motion vector candidate list including adding a global motion vector candidate to the motion vector candidate list, a transform/quantization processor 1716, an inverse quantization/inverse transform processor 1720, an in-loop filter 1724, a decoded picture buffer 1728, and/or an entropy coding processor 1732. Bit stream parameters may be input to the entropy coding processor 1732 for inclusion in the output bit stream 1736.

In operation, and with continued reference to FIG. 17, for each block of a frame of input video, whether to process block via intra picture prediction or using motion estimation/compensation may be determined. Block may be provided to intra prediction processor 1708 or motion estimation/compensation processor 1712. If block is to be processed via intra prediction, intra prediction processor 1708 may perform processing to output a predictor. If block is to be processed via motion estimation/compensation, motion estimation/compensation processor 1712 may perform processing including constructing a motion vector candidate list including adding a global motion vector candidate to the motion vector candidate list, if applicable.

Further referring to FIG. 17, a residual may be formed by subtracting a predictor from input video. Residual may be received by transform/quantization processor 1716, which may perform transformation processing (e.g., discrete cosine transform (DCT)) to produce coefficients, which may be quantized. Quantized coefficients and any associated signaling information may be provided to entropy coding processor 1732 for entropy encoding and inclusion in output bit stream 1736. Entropy encoding processor 1732 may support encoding of signaling information related to encoding a current block. In addition, quantized coefficients may be provided to inverse quantization/inverse transformation processor 1720, which may reproduce pixels, which may be combined with a predictor and processed by in loop filter 1724, an output of which may be stored in decoded picture buffer 1728 for use by motion estimation/compensation processor 1712 that is capable of constructing a motion vector candidate list including adding a global motion vector candidate to the motion vector candidate list.

With continued reference to FIG. 17, although a few variations have been described in detail above, other modifications or additions are possible. For example, in some implementations, current blocks may include any symmetric blocks (8×8, 16×16, 32×32, 64×64, 128×128, and the like) as well as any asymmetric block (8×4, 16×8, and the like).

In some implementations, and still referring to FIG. 17, a quadtree plus binary decision tree (QTBT) may be implemented. In QTBT, at a Coding Tree Unit level, partition parameters of QTBT may be dynamically derived to adapt to local characteristics without transmitting any overhead. Subsequently, at a Coding Unit level, a joint-classifier decision tree structure may eliminate unnecessary iterations and control the risk of false prediction. In some implementations, LTR frame block update mode may be available as an additional option available at every leaf node of QTBT.

In some implementations, and still referring to FIG. 17, additional syntax elements may be signaled at different hierarchy levels of bitstream. For example, a flag may be enabled for an entire sequence by including an enable flag coded in a Sequence Parameter Set (SPS). Further, a CTU flag may be coded at a coding tree unit (CTU) level.

Some embodiments may include non-transitory computer program products (i.e., physically embodied computer program products) that store instructions, which when executed by one or more data processors of one or more computing systems, cause at least one data processor to perform operations herein.

Still referring to FIG. 17, encoder 1700 may include circuitry configured to implement any operations as described above in any embodiment, in any order and with any degree of repetition. For instance, encoder 1700 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Encoder 1700 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 17, non-transitory computer program products (i.e., physically embodied computer program products) may store instructions, which when executed by one or more data processors of one or more computing systems, causes at least one data processor to perform operations, and/or steps thereof described in this disclosure, including without limitation any operations described above and/or any operations of decoder and/or encoder may be configured to perform. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, or the like.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 18:
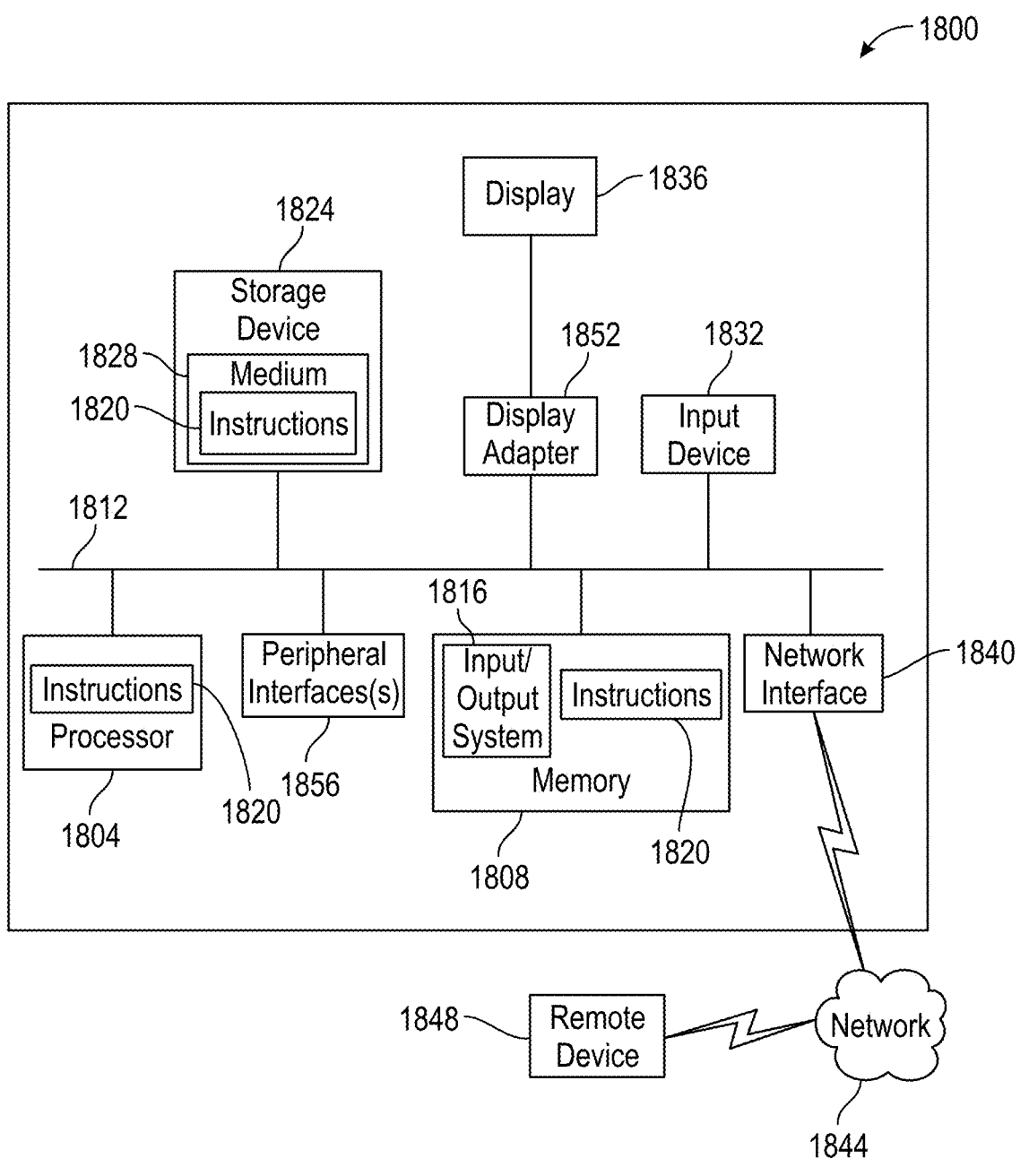
FIG. 18 is a block diagram of a computing system that can be used to implement any one or more of the methodologies disclosed herein and any one or more portions thereof.

FIG. 18 shows a diagrammatic representation of one embodiment of a computing device in the exemplary form of a computer system 1800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1800 includes a processor 1804 and a memory 1808 that communicate with each other, and with other components, via a bus 1812. Bus 1812 may include any of several types of bus structures including, but not limited to, a memory bus, a memory controller, a peripheral bus, a local bus, and any combinations thereof, using any of a variety of bus architectures.

Processor 1804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1804 may be organized according to Von Neumann and/or Harvard architecture as a non-limiting example. Processor 1804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC)

Memory 1808 may include various components (e.g., machine-readable media) including, but not limited to, a random-access memory component, a read only component, and any combinations thereof. In one example, a basic input/output system 1816 (BIOS), including basic routines that help to transfer information between elements within computer system 1800, such as during start-up, may be stored in memory 1808. Memory 1808 may also include (e.g., stored on one or more machine-readable media) instructions (e.g., software) 1820 embodying any one or more of the aspects and/or methodologies of the present disclosure. In another example, memory 1808 may further include any number of program modules including, but not limited to, an operating system, one or more application programs, other program modules, program data, and any combinations thereof.

Computer system 1800 may also include a storage device 1824. Examples of a storage device (e.g., storage device 1824) include, but are not limited to, a hard disk drive, a magnetic disk drive, an optical disc drive in combination with an optical medium, a solid-state memory device, and any combinations thereof. Storage device 1824 may be connected to bus 1812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1824 (or one or more components thereof) may be removably interfaced with computer system 1800 (e.g., via an external port connector (not shown)). Particularly, storage device 1824 and an associated machine-readable medium 1828 may provide nonvolatile and/or volatile storage of machine-readable instructions, data structures, program modules, and/or other data for computer system 1800. In one example, software 1820 may reside, completely or partially, within machine-readable medium 1828. In another example, software 1820 may reside, completely or partially, within processor 1804.

Computer system 1800 may also include an input device 1832. In one example, a user of computer system 1800 may enter commands and/or other information into computer system 1800 via input device 1832. Examples of an input device 1832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1832 may be interfaced to bus 1812 via any of a variety of interfaces (not shown) including, but not limited to, a serial interface, a parallel interface, a game port, a USB interface, a FIRE-WIRE interface, a direct interface to bus 1812, and any combinations thereof. Input device 1832 may include a touch screen interface that may be a part of or separate from display 1836, discussed further below. Input device 1832 may be utilized as a user selection device for selecting one or more graphical representations in a graphical interface as described above.

A user may also input commands and/or other information to computer system 1800 via storage device 1824 (e.g., a removable disk drive, a flash drive, etc.) and/or network interface device 1840. A network interface device, such as network interface device 1840, may be utilized for connecting computer system 1800 to one or more of a variety of networks, such as network 1844, and one or more remote devices 1848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1844, may employ a wired and/or a wireless mode of communication. In general, any network topology may be used. Information (e.g., data, software 1820, etc.) may be communicated to and/or from computer system 1800 via network interface device 1840.

Computer system 1800 may further include a video display adapter 1852 for communicating a displayable image to a display device, such as display device 1836. Examples of a display device include, but are not limited to, a liquid crystal display (LCD), a cathode ray tube (CRT), a plasma display, a light emitting diode (LED) display, and any combinations thereof. Display adapter 1852 and display device 1836 may be utilized in combination with processor 1804 to provide graphical representations of aspects of the present disclosure. In addition to a display device, computer system 1800 may include one or more other peripheral output devices including, but not limited to, an audio speaker, a printer, and any combinations thereof. Such peripheral output devices may be connected to bus 1812 via a peripheral interface 1856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An encoder for video for video coding for machine applications, the encoder comprising:
   an autoencoder encoder portion;
   a latent feature encoder coupled to the autoencoder encoder portion; and
   an autoencoder description encoder, the autoencoder description encoder being coupled to the autoencoder encoder portion;
   a multiplexor, the multiplexor coupled to the latent feature encoder and the autoencoder description encoder and providing a coded bitstream.

2. The encoder of claim 1, wherein the autoencoder encoder portion is a neural network comprising a plurality of successive encoder layers and a bottle neck layer after the final encoder layer.

3. The encoder of claim 2, wherein with each successive encoder layer having fewer neurons than the prior layer, and a bottle neck layer having fewer neurons than the final encoder layer.

4. The encoder of claim 3, wherein the bottle neck layer has fewer neurons than the final encoder layer.

5. The encoder of claim 2, wherein the number of encoder layers is the same as a number of layers in a decoder portion of a compatible decoder.

6. An decoder for encoded video for video coding for machine applications, the decoder comprising:
   a demultiplexor receiving a bitstream encoded with an autoencoder;
   a latent feature decoder coupled tot the demultiplexor;
   an autoencoder description decoder coupled to the demultiplexor;
   an autoencoder decoder portion, the autoencoder decoder portion coupled to the autoencoder description decoder and the latent feature decoder, the autoencoder decoder portion providing decoded video for machine use.

7. The decoder of claim 5, wherein the autoencoder decoder portion is a neural network comprising a bottle neck layer as an input layer and a plurality of successive decoder layers.

8. The decoder of claim 6, wherein with each successive decoder layer has a higher number of neurons than the prior layer.

9. The decoder of claim 7, wherein the bottle neck layer has fewer neurons than the first decoder layer.

10. The decoder of claim 6, wherein the number of decoder layers is the same as a number of layers in an encoder portion of the encoder which generated the coded bitstream.

11. A system for encoding image data in a video coding for machine application, the system comprising:
    a video coding for machine (VCM) encoder, the VCM encoder comprising an autoencoder encoder portion and an autoencoder bottleneck portion, the VCM encoder receiving image information and generating a coded bitstream including feature data of the image information; and
    a VCM decoder, the VCM decoder comprising the autoencoder bottleneck portion and an autoencoder decoder portion, the VCM decoder receiving the coded bitstream and reconstructing the image information from the feature data.

12. The system of claim 11, wherein the autoencoder encoder portion is a neural network comprising a plurality of successive encoder layers with each successive encoder layer having fewer neurons than the prior layer, and the bottle neck portion having fewer neurons than a final encoder layer.

13. The system of claim 12, wherein the autoencoder decoder portion is a neural network comprising a plurality of successive encoder layers with each successive decoder layer having a higher number of neurons than the prior layer, and the bottle neck portion having fewer neurons than the first decoder layer.

14. The system of claim 13, wherein the number of encoder layers in the encoder portion is the same as a number of layers in a decoder portion.

15. The system of claim 11, wherein the autoencoder encoder portion is in communication with the autoencoder decoder portion and updates to the autoencoder are communicated between the VCM encoder and VCM decoder.

16. The system of claim 11, wherein the VCM encoder further comprises:
    an autoencoder description encoder, the autoencoder description encoder being coupled to the autoencoder encoder portion;
    a latent feature encoder coupled to the autoencoder encoder portion; and
    a multiplexor, the multiplexor coupled to the latent feature encoder and the autoencoder description encoder and providing a coded bitstream.

17. The system of claim 11, wherein VCM decoder further comprises:
    a demultiplexor receiving the coded bitstream;
    a latent feature decoder coupled to the demultiplexor;
    an autoencoder description decoder coupled to the demultiplexor; and
    the autoencoder decoder portion being coupled to the autoencoder description decoder and the latent feature decoder.

* * * * *